(12) United States Patent
Kondou

(10) Patent No.: US 8,320,686 B2
(45) Date of Patent: Nov. 27, 2012

(54) DETAILED DESCRIPTION OF THE INVENTION

(75) Inventor: Takahiro Kondou, Fukuoka (JP)

(73) Assignee: Panasonic Corporation, Osaka (JP)

( * ) Notice: Subject to any disclaimer, the term of this patent is extended or adjusted under 35 U.S.C. 154(b) by 945 days.

(21) Appl. No.: 12/373,791

(22) PCT Filed: Sep. 7, 2007

(86) PCT No.: PCT/JP2007/067530
§ 371 (c)(1),
(2), (4) Date: Jan. 14, 2009

(87) PCT Pub. No.: WO2008/032660
PCT Pub. Date: Mar. 20, 2008

(65) Prior Publication Data
US 2009/0257666 A1 Oct. 15, 2009

(30) Foreign Application Priority Data
Sep. 11, 2006 (JP) .................................. 2006-245202

(51) Int. Cl.
*G06K 9/36* (2006.01)
(52) U.S. Cl. ...................................................... 382/232
(58) Field of Classification Search .......... 382/232–233, 382/236, 238; 386/353–356; 348/384.1, 348/394.1, 420.1, 430.1–431.1; 375/240, 375/240.12, 240.24–240.26; 370/468; 709/230, 709/232–233; 358/426.07, 426.09
See application file for complete search history.

(56) References Cited

U.S. PATENT DOCUMENTS

| | | | |
|---|---|---|---|
| 5,754,241 A | 5/1998 | Okada et al. | |
| 6,011,598 A * | 1/2000 | Tsuji et al. | 375/240.26 |
| 6,295,321 B1 * | 9/2001 | Lyu | 375/240.25 |
| 6,330,286 B1 * | 12/2001 | Lyons et al. | 375/240.28 |
| 6,590,902 B1 | 7/2003 | Suzuki et al. | |
| 6,836,513 B2 | 12/2004 | Hayashita et al. | |
| 7,016,970 B2 * | 3/2006 | Harumoto et al. | 709/233 |

(Continued)

FOREIGN PATENT DOCUMENTS

JE    2003-102008    4/2003

(Continued)

OTHER PUBLICATIONS

International Search Report issued Oct. 2, 2007 in the International (PCT) Application of which the present application is the U.S. National Stage.

*Primary Examiner* — Jose Couso
(74) *Attorney, Agent, or Firm* — Wenderoth, Lind & Ponack, L.L.P.

(57) ABSTRACT

Whether or not underflow is being occurred or underflow is highly likely to occur is judged based on an image encoded data amount in a reception buffer at a time of the judgment or a change in the image encoded data amount with time. When the judgment is affirmative, a composite image data piece corresponding to one frame is generated by extracting an image data piece in the frame memory, decoding part of an image encoded data piece in the reception buffer and replacing part of the extracted the image data piece with the decoded part of the image encoded data piece. Composite image data pieces are repeatedly generated such that an occupancy ratio of replaced part of the image data piece increases each time a piece of the composite image data is newly generated, and the composite image data pieces are outputted in order of generation.

15 Claims, 17 Drawing Sheets

U.S. PATENT DOCUMENTS

| | | | |
|---|---|---|---|
| 7,450,646 B2 * | 11/2008 | Kurauchi | 375/240.26 |
| 7,539,347 B2 * | 5/2009 | Fuchie | 382/236 |
| 7,548,984 B2 * | 6/2009 | Kurauchi | 709/231 |
| 2003/0223494 A1 | 12/2003 | Kurauchi | |
| 2004/0261113 A1 | 12/2004 | Paul et al. | |

FOREIGN PATENT DOCUMENTS

| | | |
|---|---|---|
| JP | 2-296454 | 12/1990 |
| JP | 7-307940 | 11/1995 |
| JP | 8-242445 | 9/1996 |
| JP | 8-331560 | 12/1996 |
| JP | 10-70730 | 3/1998 |
| JP | 10-308944 | 11/1998 |
| JP | 200-50261 | 2/2000 |
| JP | 2000-78573 | 3/2000 |
| JP | 2002-101417 | 4/2002 |
| JP | 2004-357205 | 12/2004 |

* cited by examiner

FIG. 3

| | MB0 | MB1 | · · | MB10 |
|---|---|---|---|---|
| VIDEO PACKET 0 | MB11 | MB12 | · · | MB21 |
| | MB22 | MB23 | · · | MB32 |
| | MB33 | MB34 | · · | MB43 |
| VIDEO PACKET 1 | MB44 | MB45 | · · | MB54 |
| | MB55 | MB56 | · · | MB65 |
| | MB66 | MB67 | · · | MB76 |
| VIDEO PACKET 2 | MB77 | MB78 | · · | MB87 |
| | MB88 | MB89 | · · | MB98 |

FRAME N

FIG. 6

| FRAME NUMBER | VIDEO PACKET NUMBER | START MB NUMBER | END MB NUMBER | START ADDRESS | SIZE |
|---|---|---|---|---|---|
| N | 0 | 0 | 32 | 0x0100 | 0x0100 |
|   | 1 | 33 | 65 | 0x0200 | 0x0100 |
|   | 2 | 66 | 98 | 0x0300 | 0x0100 |
| N+1 | 0 | 0 | 32 | 0x0400 | 0x0100 |

FIG. 7

| 1 | 1 | 1 | 1 | 1 | 1 | 1 | 1 | 1 | 1 | 1 |
|---|---|---|---|---|---|---|---|---|---|---|
| 2 | 2 | 2 | 2 | 2 | 2 | 2 | 2 | 2 | 2 | 2 |
| 2 | 3 | 4 | 4 | 4 | 4 | 4 | 4 | 4 | 3 | 2 |
| 2 | 3 | 4 | 5 | 5 | 5 | 5 | 5 | 4 | 3 | 2 |
| 2 | 3 | 4 | 5 | 5 | 5 | 5 | 5 | 4 | 3 | 2 |
| 2 | 3 | 4 | 5 | 5 | 5 | 5 | 5 | 4 | 3 | 2 |
| 2 | 3 | 4 | 4 | 4 | 4 | 4 | 4 | 4 | 3 | 2 |
| 2 | 2 | 2 | 2 | 2 | 2 | 2 | 2 | 2 | 2 | 2 |
| 1 | 1 | 1 | 1 | 1 | 1 | 1 | 1 | 1 | 1 | 1 |

| FRAME NUMBER | VIDEO PACKET NUMBER | START MB NUMBER | END MB NUMBER | START ADDRESS | SIZE | MOTION VECTOR (HORIZONTAL DIRECTION, VERTICAL DIRECTION) |
|---|---|---|---|---|---|---|
| N | 0 | 0 | 32 | 0x0100 | 0x0100 | MB0~MB21 (0, 0) MB22~MB32 (1, -5) |
| N | 1 | 33 | 65 | 0x0200 | 0x0100 | MB33~MB54 (-1, 2) MB55~MB65 (0, 0) |
| N | 2 | 66 | 98 | 0x0300 | 0x0100 | MB66~MB76 (16, -20) MB77~MB98 (0, 0) |
| N+1 | 0 | 0 | 32 | 0x0400 | 0x0100 | MB0~MB32 (0, 0) |

FIG. 16B

| MOTION VECTOR MV (EACH OF HORIZONTAL DIRECTION AND VERTICAL DIRECTION) | IMPORTANCE LEVEL |
|---|---|
| $MV == 0$ | 0 |
| $(-2 \leq MV < 0)$ or $(0 < MV \leq 2)$ | 1 |
| $(-4 \leq MV < -2)$ or $(2 < MV \leq 4)$ | 2 |
| $(-8 \leq MV < -4)$ or $(4 < MV \leq 8)$ | 3 |
| $(-16 \leq MV < -8)$ or $(8 < MV \leq 16)$ | 4 |
| $(MV < -32)$ or $(32 < MV)$ | 5 |

FIG. 17A

| FRAME NUMBER | VIDEO PACKET NUMBER | START MB NUMBER | END MB NUMBER | START ADDRESS | SIZE | MOTION VECTOR (HORIZONTAL DIRECTION, VERTICAL DIRECTION) | PICTURE TYPE |
|---|---|---|---|---|---|---|---|
| N | 0 | 0 | 32 | 0x0100 | 0x0100 | MB0~MB32 (0, 0) | I PICTURE |
| | 1 | 33 | 65 | 0x0200 | 0x0100 | MB33~MB65 (0, 0) | |
| | 2 | 66 | 98 | 0x0300 | 0x0100 | MB66~MB98 (0, 0) | |
| N+1 | 0 | 0 | 32 | 0x0400 | 0x0100 | MB0~MB32 (0, 0) | OTHER THAN I PICTURE |

FIG. 17B

| AVERAGE AMOUNT OF CODES D PER MACROBLOCK | IMPORTANCE LEVEL |
|---|---|
| $D \leq 5$ | 0 |
| $5 < D \leq 10$ | 1 |
| $10 < D \leq 50$ | 2 |
| $50 < D \leq 100$ | 3 |
| $100 < D \leq 500$ | 4 |
| $500 < D$ | 5 |

DETAILED DESCRIPTION OF THE INVENTION

TECHNICAL FIELD

The present invention relates to technology that decodes encoded image data, and in particular to technology of decoding encoded image data when the encoded image data is played back in a streaming method.

BACKGROUND ART

In recent years, a streaming method has been widely used that plays back image data while receiving the image data via channels such as the internet.

In such streaming method, the problem is how to respond when the transmission delay is caused due to excessive communication load imposed on the channels (i.e. congestion) such as access being concentrated on the channels. Under a condition in which transmission delay occurs, a phenomenon in which image data necessary for playback does not arrive at a receiving side at a necessary time (this phenomenon is called reception buffer underflow) may occur.

Conventionally, an MPEG video recorder is known that stops decoding processing on image data, and continuously outputs an immediately preceding decoded image when the reception buffer underflow is caused. Specifically, the MPEG video recorder (i) compares an amount of an MPEG bitstream stored in the reception buffer with a predetermined threshold amount, (ii) skips the decoding processing when the amount of the MPEG bitstream stored in the reception buffer is lower than the threshold amount, and (iii) continues to output a decoding result of the MPEG bitstream that has been read from a bit buffer before the decoding processing is skipped.

In such way, the MPEG video recorder of the conventional technology skips decoding processing when the amount of the MPEG bitstream in the reception buffer is lower than the threshold amount (i.e. when it is highly likely that the reception buffer underflow will occur). This (i) allows the amount of the MPEG bitstream in the reception buffer to increase, (ii) prevents the reception buffer underflow, and (iii) causes video output to continue to be performed. Therefore, display continues to be performed, and a display image is not distorted.
Patent Document 1: Japanese published unexamined publication No. H8-331560

SUMMARY OF THE INVENTION

The Problems to be Solved by the Invention

However, since the MPEG video recorder of the conventional technology skips the decoding processing, and continuously outputs the decoding result of the MPEG bitstream which has been read from the reception buffer before the decoding processing is skipped while the amount of the MPEG bitstream in the reception buffer is lower than the threshold amount, it is problematic that updating of the display image appears to be stopped for a predetermined period of time.

Accordingly, a user viewing the display image may be concerned that a device failure might have been occurred or communication might be interrupted. In some cases, although the device functions normally, the user viewing the display image may execute commands such as stopping operation or disconnecting communication just because the reception buffer underflow is caused due to the delay in the channel.

The above-stated problems are more apparent in transmitting and receiving images at real time on a wireless channel than in transmitting and receiving images on a wired channel. This is because the reception buffer underflow due to the delay in the channel often occurs from a perspective that (i) the wireless channel has a narrower band than the wired channel, and (ii) an error rate increases.

However, it is predicted that, in the future, a case where moving pictures which have been taken are distributed on a network, and the distributed moving picture is viewed at real time (form like so-called live relay) will increase at different situations due to reasons such as the following: (i) further improvement in moving picture processing performance and in communication performance in camera-equipped mobile telephones, (ii) improvement in broadband wireless access environment and (iii) wireless network connection and the like according to implementation of network functions in devices such as cameras, video cameras and the like. In this regard, when a state of congestion occurs at some event, for example, because (i) many camera devices are connected to a certain wireless access point and (ii) moving pictures which have been taken by each of the camera devices are distributed on a network, marked transmission delay may occur in transmitting the moving picture data to be transmitted. As a result, update of a display image may be stopped for a few or more seconds at the receiving side due to the reception buffer underflow.

The present invention has an objective to provide an image decoding device that prevents update of the image display from stopping for a certain period of time, or shortens a time period in which the update stops, even under a condition in which the reception buffer underflow occurs.

Means to Solve the Problems

The present invention is an image decoding device that, while taking pieces of image encoded data sequentially received from outside into a reception buffer, sequentially (i) reads the pieces of image encoded data from the reception buffer, (ii) decodes the read pieces of image encoded data into pieces of image data and (iii) outputs the pieces of image data, the image decoding device comprising: a frame memory operable to temporarily hold the pieces of image data; a judgment unit operable to make a judgment of whether or not underflow is being caused, or the underflow is highly likely to be caused, based on one of (i) an image encoded data amount in the reception buffer at a time of the judgment and (ii) a change in the image encoded data amount with time; a composite image generation unit operable, when a result of the judgment is affirmative, to generate a new piece of composite image data corresponding to one frame by (i) extracting a piece of the image data stored in the frame memory, (ii) decoding part of a piece of the image encoded data left in the reception buffer, and (iii) replacing part of the extracted piece of the image data with the decoded part of the piece of the image encoded data; and an output unit operable to output the new piece of the composite image data which has been generated, wherein the composite image generation unit repeatedly generates pieces of the composite image data such that an occupancy ratio of replaced part of the piece of the image data increases each time a piece of the composite image data is newly generated, and the output unit outputs the pieces of the composite image data which have been generated in order of generation.

Effect of the Invention

With such structure described in the above means to solve the problems, since a plurality of composite images are outputted that have been generated such that the occupancy ratio of replaced part of the piece of the image data gradually increases with each replacement, display content slowly changes.

By realizing slow changes in the display content, it is possible to have the user understand a condition in which a delay is not caused because of failure of the image decoding device or disconnection of communication, but the delay is caused because a network is just congested.

Here, each of the pieces of image encoded data received from outside may be composed of a plurality of image blocks, and the image decoding device may further comprise an importance level calculation unit operable to calculate an importance level for each of the image blocks, wherein the composite image generation unit may replace the part of the piece of the image data stored in the frame memory with one of the image blocks having a highest importance level of the calculated importance levels.

Also, each of the image blocks may be composed of at least one of image fragments, numeric values may be pre-allocated to the image fragments in one to one correspondence, and the importance level for each of the image blocks may be calculated based on the numeric values allocated to the image fragments composing the corresponding image blocks.

In such case, the allocated numeric values may be highest at positions closest to a center of a frame.

Also, as image motions become larger, the allocated numeric values may become higher.

In such way, it is possible to update part of the piece of the image data which seems important to the user first since the composite image generation unit can replace part of the piece of the image data that is closer to the center of the frame or part of the piece of the image data that has a large motion first.

Here, the numeric values may be allocated in a plurality of tables, and the importance level calculation unit may dynamically switch between the plurality of tables based on information obtained from the piece of the image encoded data left in the reception buffer, and calculate the importance levels.

In such case, the information obtained from the piece of the image encoded data may be information showing a picture type.

In such way, the importance level calculation unit can calculate the importance levels based on information which can be obtained from the piece of the image encoded data left in the reception buffer. For example, when one of the plurality of tables is a table based on a motion vector, the motion vector cannot be obtained if a picture type is an I picture, and therefore the importance levels cannot be calculated using the table based on the motion vector. However, it is possible to calculate the importance levels by using another table. Thus, by using the plurality of tables, it is possible to avoid a situation in which the importance levels cannot be calculated.

Here, the composite image generation unit may generate, when a result of the judgment is negative, a new piece of the image data corresponding to one frame by (i) extracting the piece of the image data stored in the frame memory, (ii) decoding the piece of the image encoded data left in the reception buffer, the piece of the image encoded data corresponding to one frame, and (iii) replacing the extracted piece of the image data with the decoded piece of the image encoded data.

In such way, it is possible to change display content according to the amount of the image encoded data left in the reception buffer. That is, it is possible to realize smooth changes in the display content since the piece of the image data is replaced in units of frames in the image decoding device when the result of the judgment is negative. As a result, it is possible to provide an image which is easy for the user to view.

The image decoding device may further comprise an auxiliary frame memory, wherein the new piece of the composite image data may be stored in the auxiliary frame memory, and the pieces of the composite image data which have been generated may be stored alternately in the frame memory and the auxiliary frame memory.

In such way, the composite image generation unit can easily generate composite image data pieces by using pieces of the image data stored in the frame memory and the auxiliary frame memory.

Here, the composite image generation unit may replace, in units of slices, the piece of the image data stored in the frame memory with a piece of the image data decoded from a piece of the image encoded data.

In such way, a range of each slice can be easily specified by detecting a special bit string (SYNC word) in the piece of the image encoded data left in the reception buffer. Therefore, processing load imposed on the image decoding device can be reduced.

Here, a data size of the part of the piece of the image encoded data left in the reception buffer at a time of the replacement may vary according to the image encoded data amount in the reception buffer.

In such way, for example, when the amount of the image encoded data left in the reception buffer is sufficient, it is possible to provide an image which is easy for the user to view by increasing the data size at the time of replacing data and realizing smooth changes in the display content. Also, even when the amount of the image encoded data left in the reception buffer is not sufficient, it is possible to prevent the update of the image from stopping by reducing the data size at the time of replacing the data and realizing slow changes in the display content.

Here, the piece of the image data stored in the frame memory may have been decoded immediately before the composite image generation unit decodes the part of the piece of the image encoded data left in the reception buffer.

In such way, the composite image generation unit can generate a composite image data which looks less odd.

BRIEF DESCRIPTION OF THE DRAWINGS

FIG. 3 is a structural diagram of one frame-worth of image encoded data (image of a decoding image) of the first embodiment of the present invention;

FIG. 6 shows a search result in a video packet detection unit 311 in the first embodiment of the present invention;

FIG. 7 shows an importance level table 700 stored in an importance level table storage unit 312 in the first embodiment of the present invention;

FIG. 16A shows a search result in the video packet detection unit 311 in a modification 1, and FIG. 16B shows an importance level table 1301 stored in the importance level table storage unit in the modification 1; and FIG. 17A shows a search result in the video packet detection unit 311 in a modification 2, and FIG. 17B shows an importance level table 1401 stored in an importance level table storage unit in the modification 2.

DESCRIPTION OF NUMERAL REFERENCES

Figure 1:
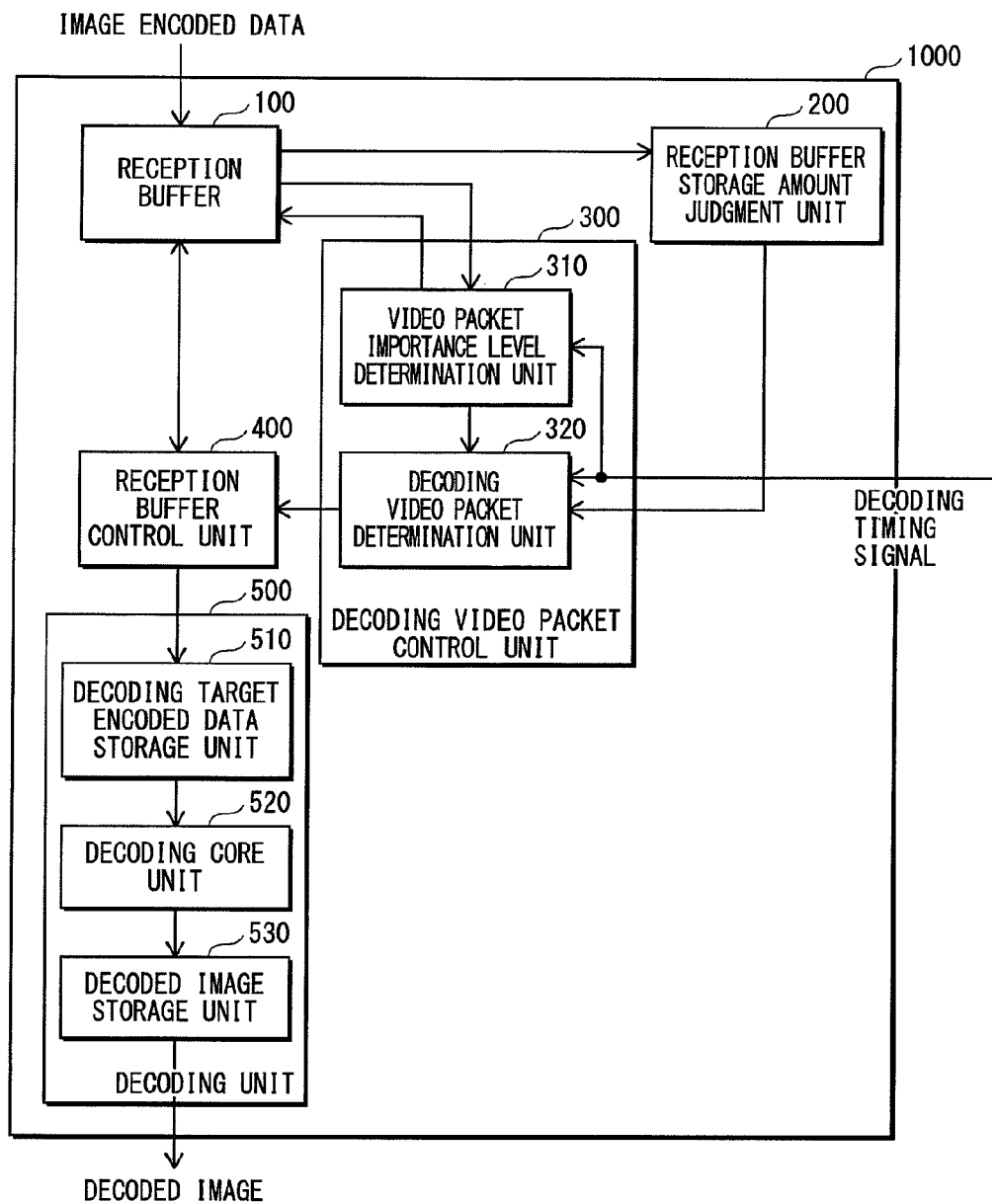
FIG. 1 is a block diagram showing functions of an image decoding device 1000 in a first embodiment of the present invention.

1000 image decoding device
100, 2201 reception buffer
200 reception buffer storage amount judgment unit
300 decoding video packet control unit
310 video packet importance level determination unit
320 decoding video packet determination unit
400 reception buffer control unit
500 decoding unit
510 decoding target encoded data storage unit
520 decoding core unit
530 decoded image storage unit
101, 511, 2200 memory
102 readpointer A
103 readpointer B
104, 201 remainsize
105, 513 writepointer
106 adder
107 switch
202 threshold amount storage unit
203 judgment core unit
311 video packet detection unit
312 importance level table storage unit
313 video packet importance level calculation unit
600, 1300, 1400 search result for each video packet
700, 2204, 1301, 1401 importance level table
512 readpointer
531, 2212 bank A
532, 2213 bank B
901 decoded image (frame N−1)
902 decoded image (only a video packet 1 of a frame N is updated)
903 decoded image (only a video packet 0 of the frame N is updated)
904 decoded image (only a video packet 2 of the frame N is updated)
1 image decoding system
2 channel
10 image encoding device
11 input image storage unit
12 encoding unit
13 transmission buffer
2000 processing device
2100 CPU
2202 image encoded data storage amount
2203 threshold amount
2205 reception buffer image encoded data storage state
2206 readpointer A
2207 readpointer B
2208 writepointer
2209 image encoded data video packet information
2210 decoding target encoded data information
2211 decoded image area

DETAILED DESCRIPTION OF THE INVENTION

The following describes embodiments of the present invention referring to the drawings.

First Embodiment

Outline

Main technology in digital signal processing includes encoding technology that compresses and encodes a digitized information signal. Although this encoding technology has various standards, the MPEG (Moving Picture Image Coding Experts Group) standard is mostly used especially in the field of dealing with moving picture data. Examples of the MPEG standard include MPEG-2 method used for a digital broadcasting system and the like, and the MPEG-4 method used for a TV telephone and the like by a mobile telephone.

At present, in the MPEG-4 method, a structure in which (i) one frame is divided into video packets in a process of compressing and encoding image data, and (ii) the data is transmitted in units of video packets is mostly used. The purpose of such structure is to keep adverse effects to a limited range when data is garbled or lost when transmitting data.

When the reception buffer underflow has occurred or the reception buffer underflow is highly possibly to occur, the image decoding device pertaining to the present invention generates a new composite image data piece corresponding to one frame by replacing, in units of video packets, a piece of image data decoded from a piece of image encoded data left in a reception buffer with a piece of image data stored in a frame memory. Pieces of composite image data each corresponding to one frame are repeatedly generated such that an occupancy ratio of replaced part increases each time a piece of the composite image data is newly generated. Then the pieces of composite image data which have been generated are outputted in the order of generation.

In such way, although the image data as a whole is not updated, some change can be seen on a screen since the part of the image data is updated.

By viewing a partially updated screen, a user can recognize that communication is not disconnected but just congested, and also can at least judge that there is no device failure. As a result, it is possible to keep the user from being concerned about device failure, disconnection of communication and the like.

Structure

FIG. 1 is a block diagram showing the functional structure of an image decoding device 1000 in the first embodiment of the present invention. As shown in FIG. 1, the image decoding device 1000 includes a reception buffer 100, a reception buffer storage amount judgment unit 200, a decoding video packet control unit 300, a reception buffer control unit 400 and a decoding unit 500.

The reception buffer 100 receives and stores encoded image data (hereinafter, "image encoded data") that is sequentially inputted from outside, and manages how much image encoded data is stored (hereinafter, "image encoded data storage amount"). The detail of functions is described in "reception buffer 100".

The image encoded data has been encoded in image fragments, and is composed of a plurality of image blocks. Each of the image blocks is composed of at least one of the image fragments. In the present embodiment, the image encoded data has been encoded according to the MPEG-4 (ISO/IEC14496-2), and has a structure in which the image fragments are macroblocks, and the image blocks are video packets. Although a description is given presuming that the image encoded data has been encoded according to the MPEG-4 method, the image encoded data is not particularly limited to this, and can be any data that has been encoded using image encoding technology.

Note that since the MPEG-4 (ISO/IEC14496-2) method, and macroblocks, video packets and decoding processing that are defined in the MPEG-4 (ISO/IEC14496-2) are known technology, and are not the emphasis of the present invention, the detail of the MPEG-4 (ISO/IEC14496-2) method, the macroblocks, the video packets and the decoding processing is omitted.

The reception buffer storage amount judgment unit 200 acquires information showing image encoded data storage amount managed in the reception buffer 100, and judges an image encoded data storage state of the reception buffer 100 with use of the acquired information showing the image encoded data storage amount and internally pre-stored information showing a threshold amount. The image encoded data storage state which has been judged is outputted to the decoding video packet control unit 300. The detail of functions is described in "reception buffer storage amount judgment unit 200".

Receiving a decoding timing signal showing an interval of decoding processing rates (or rates of display processing performed on a decoded image) inputted from outside, the decoding video packet control unit 300 determines which frame of the image encoded data stored in the reception buffer 100 is decoding target encoded data to be decoded based on (i) the information showing the image encoded data storage state acquired from the reception buffer storage amount judgment unit 200 and (ii) information pieces showing importance levels of respective video packets composing the frame of the image encoded data stored in reception buffer 100. The decoding video packet control unit 300 instructs the reception buffer control unit 400 to read the determined decoding target encoded data.

Receiving the instruction from the decoding video packet control unit 300, the reception buffer control unit 400 reads, from the reception buffer 100, the decoding target encoded data determined by the decoding video packet control unit 300, and transfers the read decoding target encoded data to the decoding unit 500.

The decoding unit 500 performs the decoding processing on the decoding target encoded data inputted by the reception buffer control unit 400, generates a composite image (partially updated decoded image) by using part of an immediately preceding decoded image for an area which has not been generated in the decoding processing, and outputs the composite image.

The following describes each function block in more detail.

Reception Buffer 100

Figure 2:
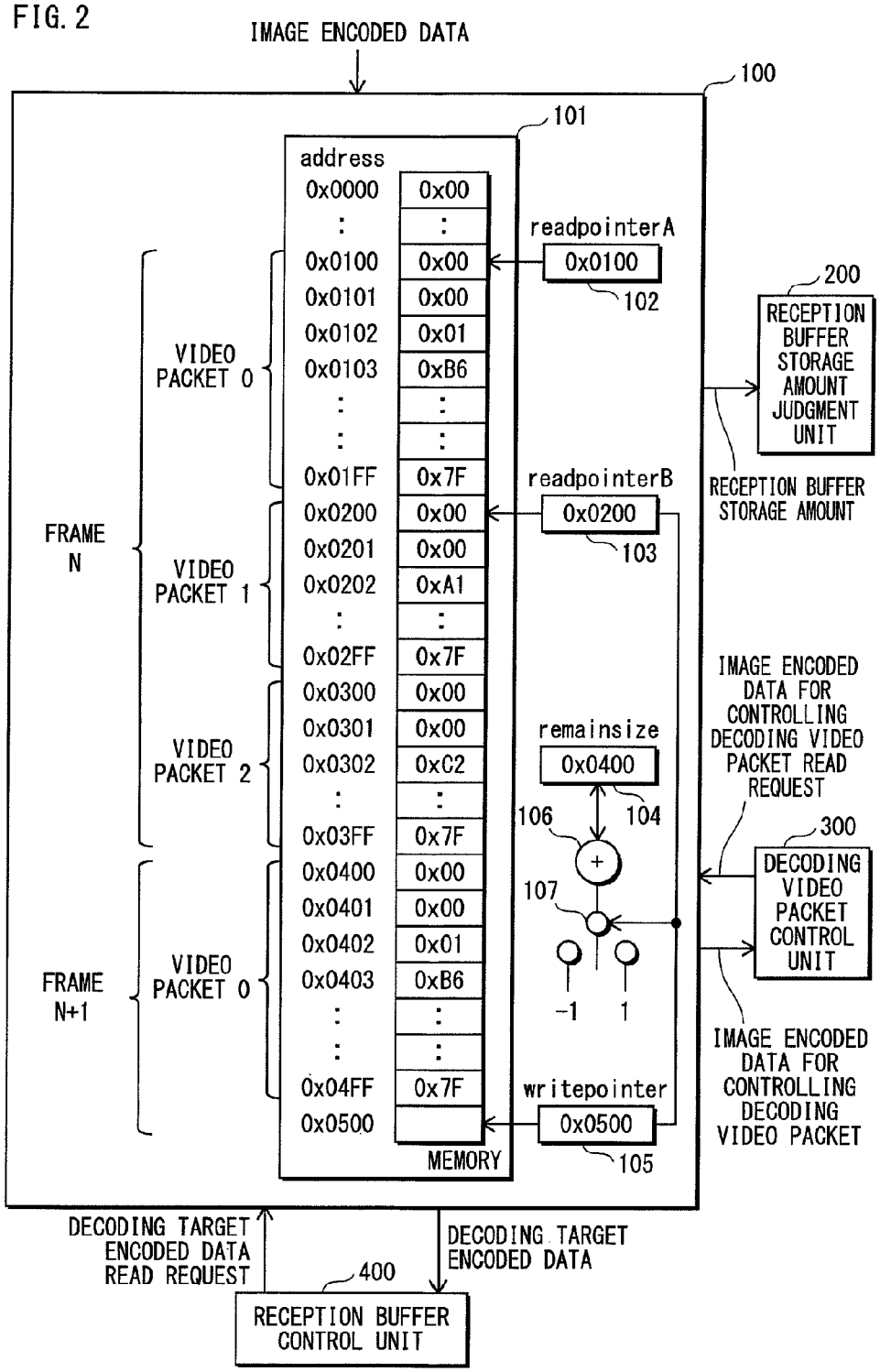
FIG. 2 is a block diagram showing detail of a reception buffer 100 in the first embodiment of the present invention.

FIG. 2 is a block diagram showing the detail of the reception buffer 100. The same elements as the elements in FIG. 1 are given the same references, and descriptions of the same elements are omitted. As shown in FIG. 2, the reception buffer 100 is composed of a memory 101, a readpointer A 102, a readpointer B 103, a remainsize 104, a writepointer 105, an adder 106 and a switch 107.

The image encoded data to be inputted is stored in an address area shown by the writepointer 105 in the memory 101. An address value shown by the writepointer 105 has an initial value of 0x0000, and is incremented by one every time one byte of the image encoded data is stored in the memory 101. While the image encoded data is being stored in the memory 101, the switch 107 is connected to a 1 side, and every time one byte of the image encoded data is stored, the remainsize 104 is incremented by one by the adder 106. Here, the address value shown by the writepointer 105 is 0x0500 with the image encoded data stored at addresses 0x0000 to 0x04FF in the memory 101.

FIG. 3 shows a structural example of one frame of the image encoded data (image of the decoded image). One frame of the image encoded data (frame N, N being a counting number and showing a frame number) is composed of 99 macroblocks (MB0 to MB98, 11 macroblocks in a horizontal direction and 9 macroblocks in a vertical direction), and has an image size of QCIF (Quarter Common Intermediate Format)(horizontal 176 pixels and vertical 144 pixels).

Also, the frame N shown in FIG. 3 is composed of three video packets: a video packet 0 (MB0 to MB32), a video packet 1 (MB33 to MB65) and a video packet 2 (MB66 to MB98).

The memory 101 in the reception buffer 100 shown in FIG. 2 stores therein the image encoded data (frame N) corresponding to one frame shown in FIG. 3 such that the image encoded data is composed of the video packet 0 (an address 0x0100 to an address 0x01FF), a video packet 1 (an address 0x0200 to an address 0x02FF) and a video packet 2 (an address 0x0300 to an address 0x03FF).

Receiving a request for reading image encoded data for controlling a decoding video packet (hereinafter, "encoded data read request") inputted by the decoding video packet control unit 300, the reception buffer 100 reads the image encoded data stored in an address shown by the read pointer A 102 from the memory 101, and transmits the read image encoded data to the decoding video packet control unit 300 as the image encoded data for controlling a decoding video packet (hereinafter, "data for controlling"). The address value shown by the readpointer A 102 has the initial value of 0x0000, and is incremented by one every time one byte of the image decoded data is read from the memory 101. Also, reading of the image encoded data from the memory 101 in response to the encoded data read request is performed until the address value shown by the readpointer A 102 is the same as an address value shown by the writepointer 105. Here, the readpointer A 102 indicates 0x0100, and the writepointer 105 indicates 0x0500. The image encoded data transmitted to the decoding video packet control unit 300 as the data for controlling is data stored at addresses 0x0100 to 0x04FF in the memory 101.

Also, receiving a request for reading the decoding target encoded data (hereinafter, "target data read request") inputted by the reception buffer control unit 400, the reception buffer 100 (i) sets, in the readpointer B 103, an address value specified in the request, (ii) reads, from the memory 101, a specified size (units of byte) worth of the image encoded data stored in an address shown by the readpointer B 103, and (iii) transmits the read specified size worth of the image encoded data to the reception buffer control unit 400 as the decoding target encoded data. While the specified size worth of the image encoded data is being read from the memory 101, the switch 107 is connected to −1 side. Every time one byte of the image encoded data is read, the readpointer B 103 is incremented by one, and the remainsize 104 is decremented by one by the adder 106. Here, the remainsize 104 is 0x0400 when (i) the whole image encoded data stored at addresses 0x0000 to 0x00FF in the memory 101 has been read using the readpointer B 103, and (ii) the writepointer 105 indicates 0x0500 as shown in the above.

Furthermore, in the case where a value of the remainsize 104 is changed when (i) the image encoded data is stored in the memory 101 by input of the image encoded data, and (ii) the image encoded data is read from the memory 101 in response to the target data read request, the reception buffer 100 notifies the reception buffer storage amount judgment unit 200 of the changed value of the remainsize 104 as a reception buffer storage amount. Here, the remainsize 104 is 0x0400 as shown in the above, and 0x0400 is notified to the reception buffer storage amount judgment unit 200 as the reception buffer storage amount.

Reception Buffer Storage Amount Judgment Unit 200

Figure 4:
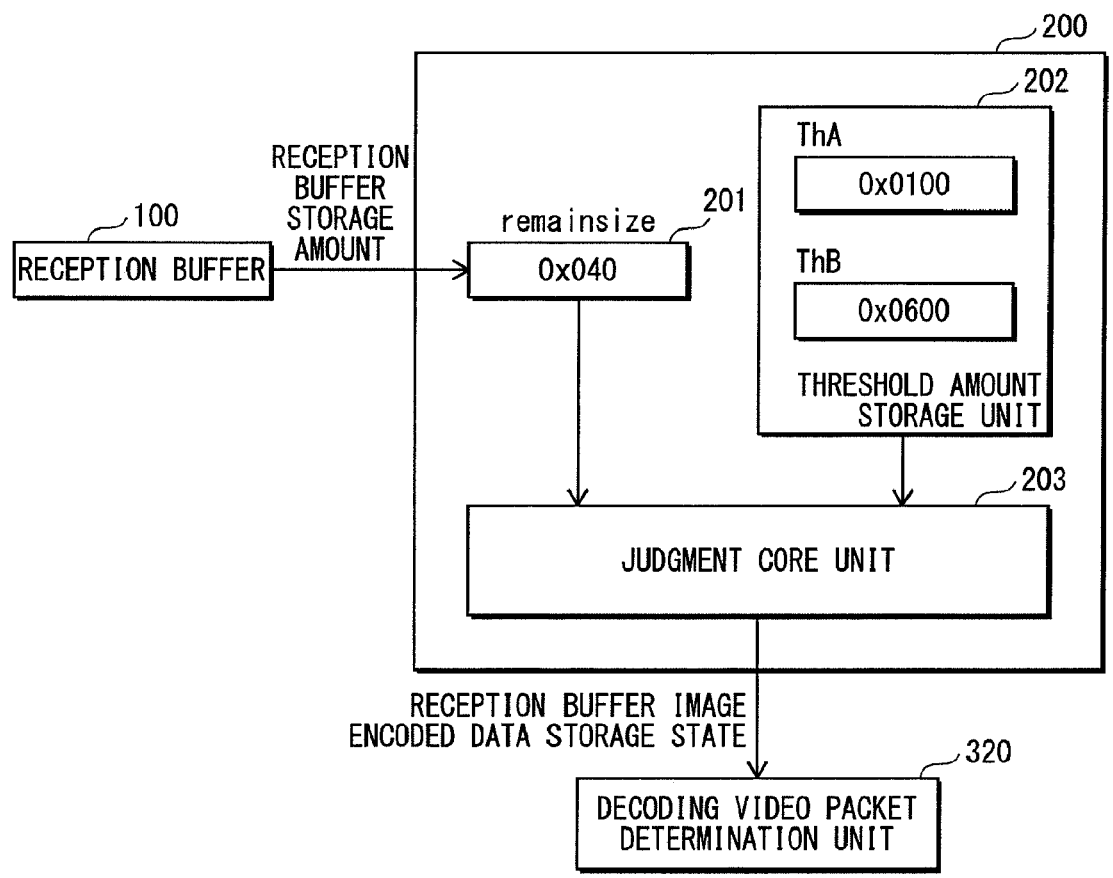
FIG. 4 is a block diagram showing detail of a reception buffer storage amount judgment unit 200 in the first embodiment of the present invention.

FIG. 4 is a functional block diagram showing detail of a reception buffer storage amount judgment unit 200. As shown in FIG. 4, the reception buffer storage amount judgment unit 200 is composed of a remainsize 201, a threshold amount storage unit 202 and a judgment core unit 203.

The reception buffer storage amount inputted from the reception buffer 100 is stored in the remainsize 201. As shown in the above, 0x0400 is inputted as the reception buffer storage amount 211, and is stored in the remainsize 201.

The threshold amount storage unit 202 stores therein a threshold amount ThA and a threshold amount ThB. Here, the threshold amount ThA is 0x0100, and the threshold amount ThB is 0x0600.

Note that although two kinds of threshold amounts (the threshold amount ThA and the threshold amount ThB) which have been pre-stored for judging the reception buffer image encoded data storage state, more threshold amounts may be used, or a threshold amount which is dynamically changed may be used.

The judgment core unit 203 (i) reads information showing the threshold amount ThA and information showing the threshold amount ThB stored in the remainsize 201 and the threshold amount storage unit 202, (ii) makes a judgment of the reception buffer image encoded data storage state (hereinafter, "encoded data storage state") based on the information showing the threshold amount ThA and the information showing the threshold amount ThB, and (iii) notifies the decoding video packet control unit 300 of a result of the judgment. A detail regarding the judgment of the encoded data storage state is described in FIG. 11.

Decoding Video Packet Control Unit 300

Figure 5:
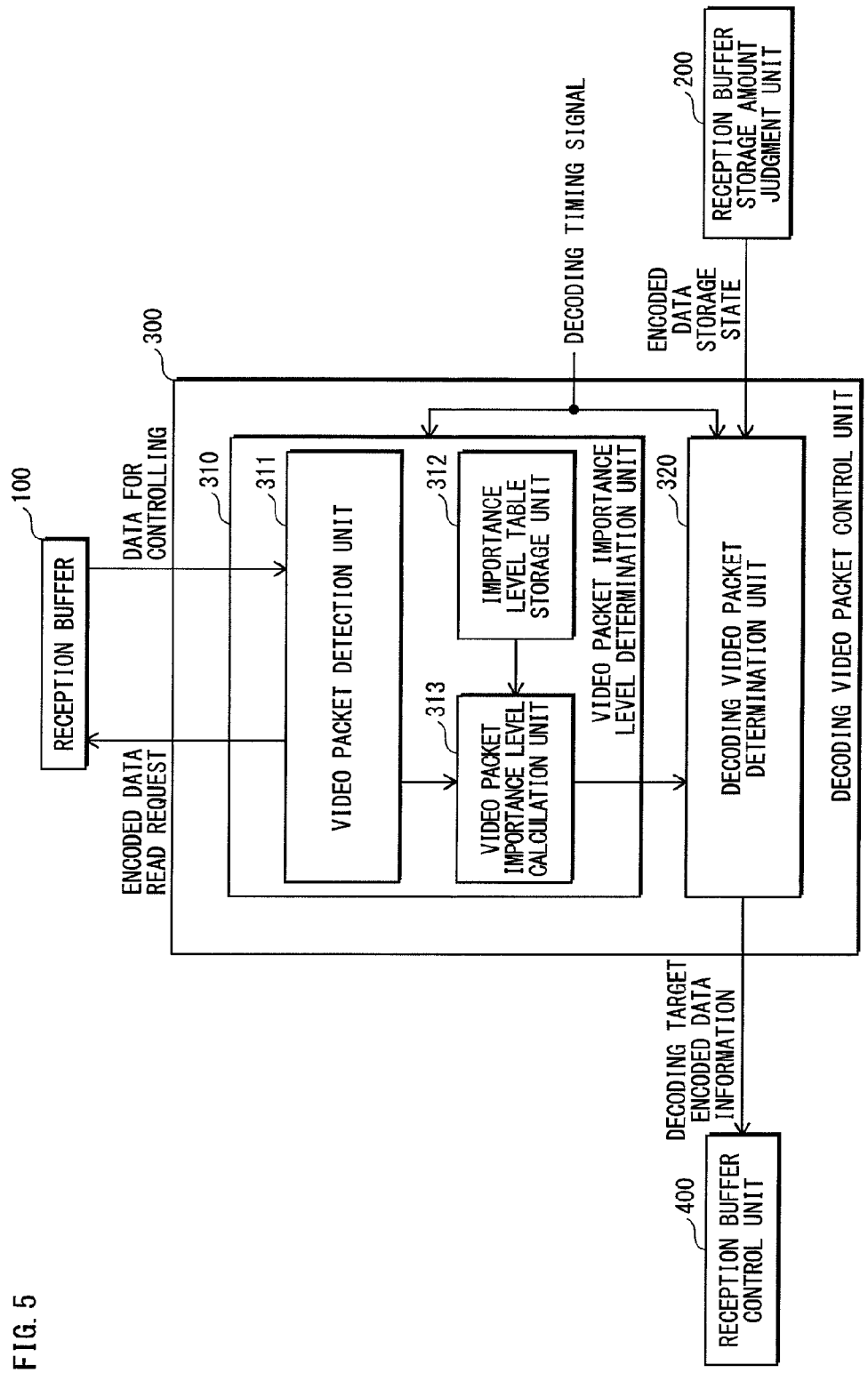
FIG. 5 is a block diagram showing detail of a decoding video packet control unit 300 in the first embodiment of the present invention.

FIG. 5 is a functional block diagram showing the detail of the decoding video packet control unit 300.

As shown in FIG. 5, the decoding video packet control unit 300 is composed of a video packet importance level determination unit 310 and a decoding video packet determination unit 320.

The video packet importance level determination unit 310 is composed of a video packet detection unit 311, an importance level table storage unit 312 and a video packet importance level calculation unit 313.

The video packet detection unit 311 outputs, to the reception buffer 100, an encoded data read request when the decoded timing signal is inputted from outside. Receiving the data for controlling outputted by the reception buffer 100 as a response to the request, the video packet detection unit 311 searches for the image encoded data inputted as the data for controlling, and detects video packets composing the image encoded data. As mentioned in the above, the image encoded data is inputted that is stored at addresses 0x0100 to 0x04FF of the memory 101 shown in FIG. 2.

Specifically, the video packet detection unit 311 detects data "0x000001B6" stored at addresses 0x0100 to 0x0103 in the memory 101 at first as a synchronous word (SYNC word) showing a start of the frame N. Data positioned after the data "0x000001B6" is a video packet 0 which is the start of the frame N. The video packet detection unit 311 stores 0x0100 as a start address of the video packet 0 of the frame N, and stores 0x00 as a macroblock number. The video packet detection unit 311 starts counting a data size of the video packet 0 of the frame N.

Sequentially, the video packet detection unit 311 continues to search for data stored at addresses from 0x0104 onward in the memory 101. Then the video packet detection unit 311 detects highest 17 bits of data "0x0000A1" stored at addresses 0x0200 to 0x0202 in the memory 101 as a SYNC word (0x000080) showing a start of a video packet. Furthermore, the video packet detection unit 311 detects the remaining bits as a macroblock number (0x000021) of the start of the video packet. Data positioned after the data "0x0000A1" is a video packet 1 which is a second video packet of the frame N. That is, a size of the video packet 0 of the frame N is 0x100, and an end macroblock number is 0x20. The video packet detection unit 311 stores 0x0200 as a start address of the video packet 1 of the frame N, and stores 0x21 as a start macroblock number together with storing the size and the end macroblock number. The video packet detection unit 311 starts counting a data size of the video packet 1 of the frame N again.

Sequentially, the video packet detection unit 311 continues to search for data stored at addresses from 0x0203 onward in the memory 101. Then the video packet detection unit 311 detects highest 17 bits of data "0x0000C2" stored at addresses 0x0300 to 0x0302 in the memory 101 as a SYNC word (0x000080) showing a start of a video packet. Furthermore, the video packet detection unit 311 detects the remaining bits as a macroblock number (0x000042) of the start of the video packet. Data positioned after the data "0x0000C2" is a video packet 2 which is a third video packet of the frame N. That is, a size of the video packet 1 of the frame N is 0x100, and an end macroblock number is 0x41. The video packet detection unit 311 stores 0x0300 as a start address of the video packet 2 of the frame N, and stores 0x42 as a start macroblock number together with storing the size and the end macroblock number. The video packet detection unit 311 starts counting a data size of the video packet 2 of the frame N again.

Sequentially, the video packet detection unit 311 continues to search for data stored at addresses from 0x0303 onward in the memory 101. Then the video packet detection unit 311 detects data "0x000001B6" stored at addresses 0x0400 to an address 0x0403 in the memory 101 as a SYNC word showing a start of a frame N+1. Data positioned after the data "0x000001B6" is a video packet 0 of the start of the frame N+1. That is, a size of the video packet 2 of the frame N is 0x100, and an end macroblock number is 0x62. The video packet detection unit 311 stores 0x0400 as a start address of the video packet 0 of the frame N+1, and stores 0x00 as a macroblock number together with storing the size and the end macroblock. The video packet detection unit 311 starts counting a data size of the video packet 0 of the frame N+1 again.

Sequentially, the video packet detection unit 311 continues to search for data stored at addresses from 0x0404 onward in the memory 101, and stops searching for the image encoded data inputted as data for controlling when an address value shown by the readpointer A 102 is the same as an address value (0x0500) shown by a writepointer 105 as shown in the above.

FIG. 6 shows a search result in the video packet detection unit 311. As shown in FIG. 6, it is possible to obtain, for each video packet, a start macroblock (MB) number, an end macroblock (MB) number, a start address, and size information. Note that start macroblock numbers and end macroblock numbers in the present figure are shown in decimal notation.

The video packet detection unit 311 transmits the search result to a video packet importance level calculation unit 313.

The importance level table storage unit 312 stores therein an importance level table as shown in FIG. 7. As shown in FIG. 7, in an importance level table 700, an importance level (highest: 5 to lowest: 1) is allocated to each unit of macroblocks in an image of a decoding image (one frame-worth of the image encoded data) (a position of each macroblock is as shown in FIG. 3). Also, the closer a position is to a center of the image, the higher the importance level is.

The video packet importance level calculation unit 313 calculates an importance level for each video packet based on (i) search results for the respective video packets inputted by the video packet detection unit 311 and (ii) the importance level table 700 stored in the importance level table storage unit 312.

Specifically, the importance levels are calculated as follows. Firstly, since a start macroblock (MB) number is 0 and an end macroblock (MB) number is 32 in the video packet 0 of the frame N, a total sum of importance levels of positions that correspond to macroblock numbers from the start macroblock number to the end macroblock number (MB0 to MB32) in the importance level table 700 is 1×11+2×11+2+3+4×7+3+2=71. Accordingly, an importance level of the video packet 0 of the frame N is 71.

Also, in the video packet 1 of the frame N, a start macroblock (MB) number is 33, and an end macroblock (MB) number is 65. Therefore, a total sum of importance levels of positions that correspond to macroblock numbers from the start macroblock number to the end macroblock number (MB33 to MB65) in the importance level table 700 is (2+3+4+5×5+4+3+2)×3=129. Therefore, an importance level of the video packet 1 of the frame N is 129.

Also, in the video packet 2 of the frame N, a start macroblock (MB) number is 66, and an end macroblock (MB) number is 98. Therefore, a total sum of importance levels of positions that correspond to macroblock numbers from the start macroblock number to the end macroblock number (MB66 to MB98) in the importance level table 700 is 1×11+2×11+2+3+4×7+3+2=71. Therefore, an importance level of the video packet 2 of the frame N is 71.

As shown in the above, the importance level (129) of the video packet 1 of the frame N is highest, and the importance level (71) of each of the video packet 0 and 2 of the frame N is low. Video packets in the frame N are ranked according to the importance levels. Firstly, since the video packet 1 of the frame N has the highest importance level, a rank (1) is assigned to the video packet 1. Since two of the video packets 0 and 2 in the frame N have the same importance level value, a video packet having smaller start macroblock (MB) number is ranked higher. Accordingly, a rank (2) is assigned to the video packet 0 of the frame N, and a rank (3) is assigned to the video packet 2 of the frame N.

The video packet importance level calculation unit 313 notifies the decoding video packet determination unit 320 of a rank (from 1 to 3) of each video packet determined in the above.

The decoding video packet determination unit 320 selects decoding target encoded data based on the rank (from 1 to 3) of each video packet notified by the video packet importance level calculation unit 313 and the encoded data storage state notified by the reception buffer storage amount judgment unit 200. Since the encoded data storage state is 2, decoding can be performed in units of video packets, and information on the video packet 1 of the frame N which is ranked highest is notified to the reception buffer control unit 400 as decoding target encoded data information. The start address (0x0200) and the size (0X0100) of the video packet 1 of the frame N in the memory 101 are notified to the reception buffer control unit 400 as decoding target encoded data information.

The decoding video packet control unit 300 controls and causes, via the reception buffer control unit 400, the decoding unit 500 to repeat image generation such that an occupancy ratio of image encoded data increases, when decoding can be performed in units of video packets. That is, the decoding video packet control unit 300 notifies the reception buffer control unit 400 of information on the video packet 0 of the frame N, and information on the video packet 2 of the frame N followed by the information on the video packet 1 of the frame N.

Note that if a video packet exists that has been notified to the reception buffer control unit 400 when decoding target encoded data is selected based on the rank (from 1 to 3) of each video packet and the encoded data storage state, such video packet is no longer a judging target, and a rank of each video packet positioned lower than such video packet is raised by one rank. For example, a video packet ranked second is ranked first, and a video packet ranked third is ranked second.

Next, the relationship between the encoded data storage state and the decoding target encoded data information is described. In the present embodiment, the encoded data storage state is 2, that is, it is judged that one or more video packets worth of encoded data is stored. Therefore, data is decoded in units of video packets. If the encoded data storage state is 3, it is judged that at least two or more frames worth of the encoded data is stored. Therefore, data corresponding to one frame is decoded. Also, when the encoded data storage state is 1, only encoded data smaller than one video packet is stored. Therefore, decoding processing is not performed.

Reception Buffer Control Unit 400

The reception buffer control unit 400 reads image encoded data from the memory 101 in the reception buffer 100 based on decoding target encoded data information (the start address (0x0200) and the size (0x0100) of the video packet 1 of the frame N in the memory 101) notified by the decoding video packet control unit 300, and transmits the read image encoded data to the decoding unit 500 as decoding target encoded data.

Decoding Unit 500

Figure 8:
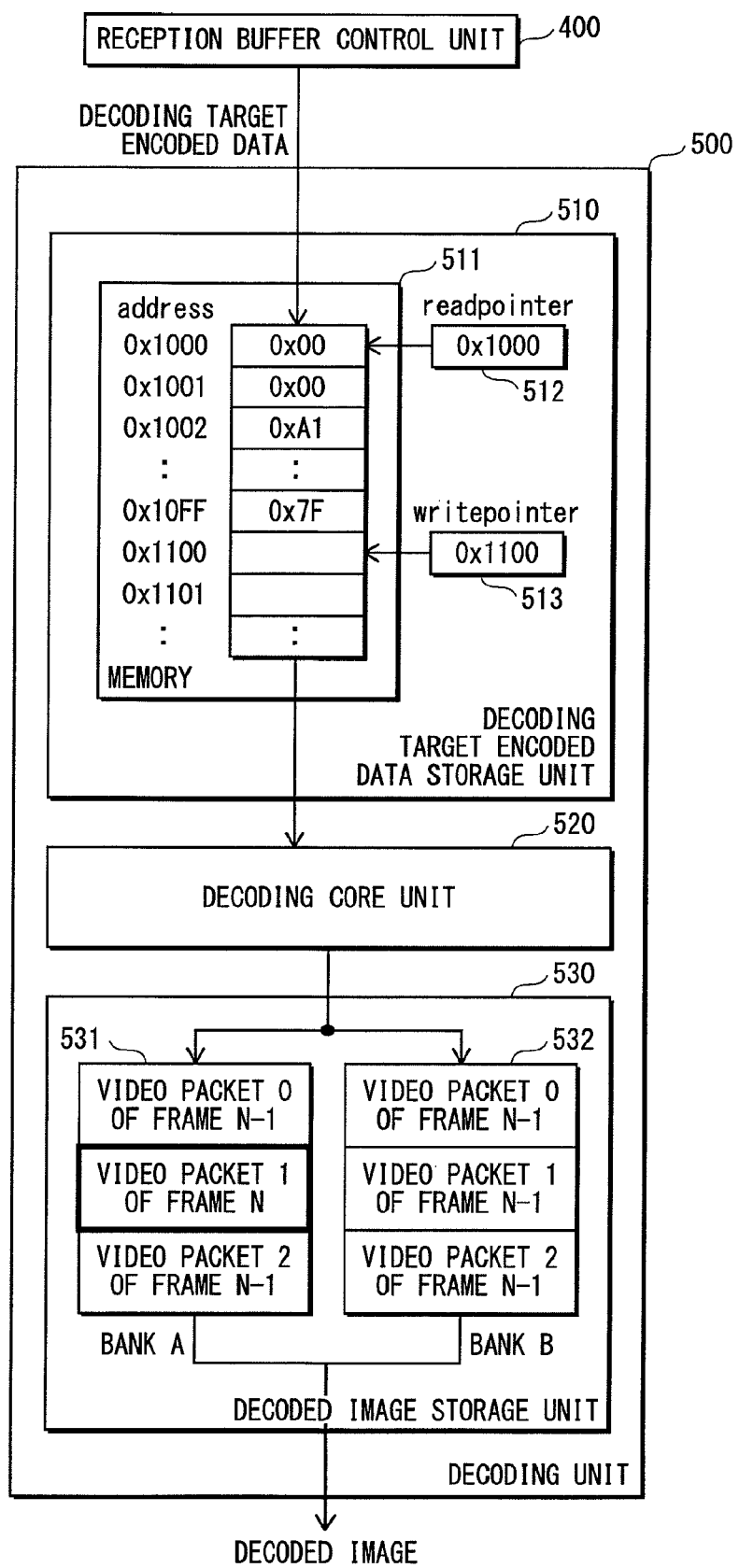
FIG. 8 is a block diagram showing detail of a decoding unit 500 in the first embodiment of the present invention.

FIG. 8 is a block diagram showing detail of the decoding unit 500.

As shown in FIG. 8, the decoding unit 500 is composed of a decoding target encoded data storage unit 510, a decoding core unit 520, and a decoded image storage unit 530 including a bank A 531 and a bank B 532.

The decoding target encoded data storage unit 510 is composed of a memory 511, a readpointer 512 and a writepointer 513.

In the decoding unit 500, the decoding target encoded data inputted by the reception buffer control unit 400 is stored in an address area shown by the writepointer 513 in the memory 511. Here, an address value shown by the writepointer 513 has an initial value of 0x1000, and is incremented by one every time one byte of the decoding target encoded data is stored in the memory 511. Here, a size of the decoding target encoded data inputted by the reception buffer control unit 400 is 0x0100 as shown in the above, and the address value indicated by the writepointer 513 after the decoding target encoded data is stored in the memory 511 is 0x1100.

Next, decoding target encoded data 210 of an address shown by the readpointer 512 is read from the memory 511, and is transmitted to a decoding core unit 805. Here, the address value shown by the readpointer 512 has an initial value of 0x1000, and the readpointer 512 is incremented by one every time one byte of the decoding target encoded data is read while the decoding target encoded data is read from the memory 511. Also, the decoding target encoded data continues to be read from the memory 511 until the address value indicated by the readpointer 512 is the same as an address value indicated by the writepointer 513.

The decoding core unit 520 performs decoding processing on the decoding target encoded data inputted by the decoding target encoded data storage unit 510, and generates a composite image (partially updated decoded image) by replacing an area which has not been generated in the decoding processing with part of an immediately preceding decoded image. More specifically, the decoding core unit 520 extracts the immediately preceding decoded image stored in the decoded image storage unit 530 (here, the bank B), and generates a composite image (i.e. a decoded image in which only the video packet 1 of the frame N−1 is updated by the video packet 1 of the frame N) by replacing part of the extracted decoded image (here, the video packet 1 of the frame N−1) with decoded image data decoded from the decoding target encoded data (the video packet 1 of the frame N).

The decoded image storage unit 530 has two areas: the bank A 531 and the bank B 532 for storing decoded images. When outputting the decoded images, the decoded image storage unit 530 outputs the decoded images alternately to the bank A 531 and the bank B 532 (e.g. outputting a first one of the decoded images to the bank A 531, a second one of the decoded images to the bank B 532, a third one of the decoded image to the bank A 531 and so forth). The immediately preceding decoded images (the video packets 0, 1, 2 of the frame N−1) are stored in the bank B 532, and the decoded images outputted by the current decoding processing are outputted to the bank A 531.

According to the above structure, even if decoding target encoded data to be inputted is only the video packet 1 of the frame N (MB 33 to MB 65, heavy-boxed part), it is possible to easily obtain a decoded image by using, for other areas (MB0 to MB32 and MB66 to MB98), immediately preceding decoded images (video packets 0 and 2 of the frame N−1) stored in the bank B532.

Subsequently, the same processing is repeatedly performed with timing that image encoded data or a decoding timing signal is inputted from outside.

The following briefly describes subsequent processing. Once the decoding target encoded data (video packet 0 of the frame N) is inputted by the reception buffer control unit 400, the decoding unit 500 generates a composite image (i.e. a decoded image in which only the video packet 0 of the frame N is updated) by (i) decoding the decoding target encoded data, (ii) extracting the decoded image stored in the bank A, (iii) replacing part of the extracted decoded image (the video packet 0 of the frame N−1) with decoded data decoded from decoding target encoded data (the video packet 0 of the frame N), and then stores the composite image in the bank B.

Furthermore, once the decoding target encoded data (video packet 2 of the frame N) is inputted by the reception buffer control unit 400, the decoding unit 500 generates a composite image (i.e. a decoded image in which only the video packet 2 of the frame N is updated) by (i) decoding the decoding target encoded data, (ii) extracting the decoded image stored in the bank B, (iii) replacing part of the extracted decoded image (the video packet 2 of the frame N−1) with decoded data decoded from decoding target encoded data (the video packet 2 of the frame N), and then stores the composite image in the bank A.

In such way, it is possible to generate the composite images such that the occupancy ratio of the decoding target encoded data gradually increases.

Figure 9:
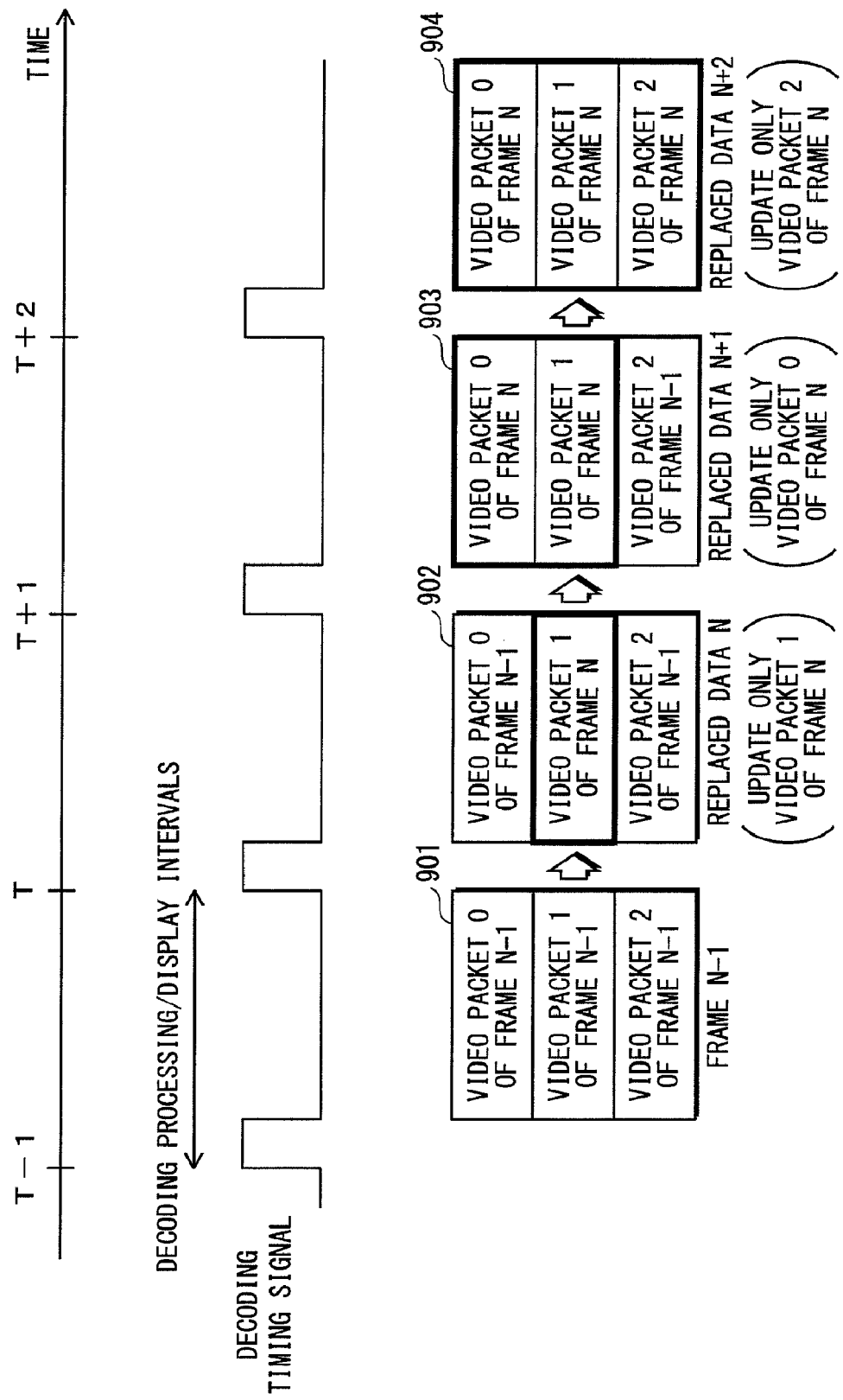
FIG. 9 shows a relationship between a decoding timing signal and a decoded image in the first embodiment of the present invention.

FIG. 9 shows a relationship between a decoding timing signal and a decoded image. As shown in FIG. 9, a decoded image 901 (frame N−1, the image as a whole is updated) is outputted in a series of processing that the image decoding device 1000 perform with respect to timing shown by a decoding timing signal inputted at a time T−1.

In a series of processing performed with respect to timing shown by a decoding timing signal inputted at a next time T, a decoded image 902 (replaced data N, only the video packet 1 of the frame N (central part of the image) being updated) is outputted.

In a series of processing performed with respect to timing shown by a decoding timing signal inputted at a next time T+1, a decoded image 903 (replaced data N+1, the video packet 0 of the frame N (upper part of the image) being further updated) is outputted.

In a series of processing performed on a decoding timing signal inputted at next time T+2, a decoded image 904 (replaced data N+2, the video packet 2 of the frame N (lower part of the image) is further updated) is outputted. As a result, the image as a whole of the frame N−1 has been updated.

Operation of the Image Decoding Device 1000

Figure 10:
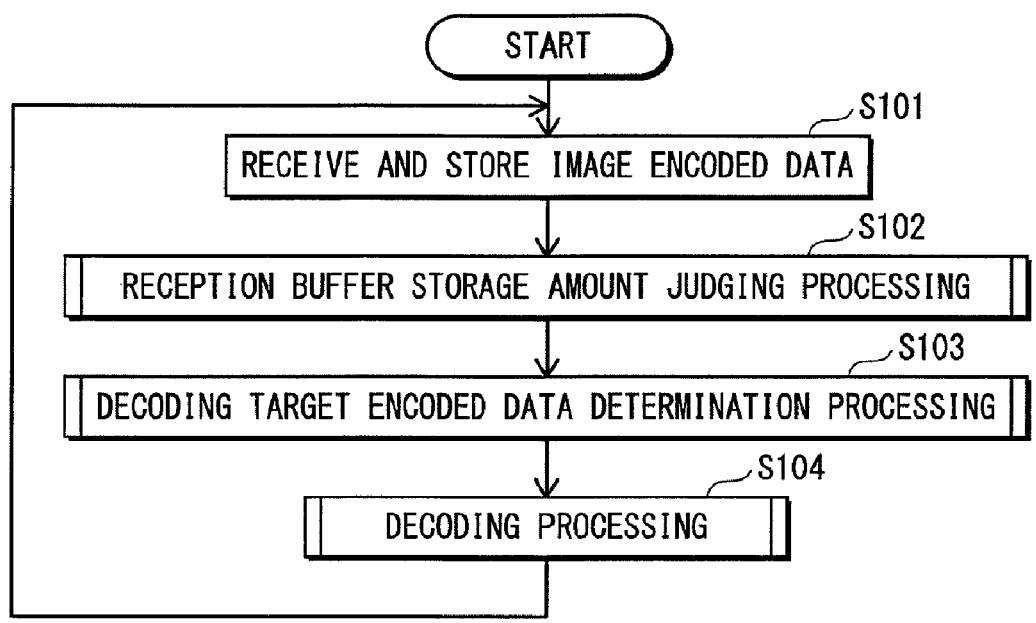
FIG. 10 is a flow chart showing an operation of the image decoding device 1000 in the first embodiment of the present invention.

FIG. 10 is a flowchart showing an operation of the image decoding device 1000.

As shown in FIG. 10, the image decoding device 1000 stores image encoded data sequentially inputted from outside in a reception buffer, and manages an image encoded data storage amount (hereinafter, "image encoded data storing step") (Step S101). Next, the image decoding device 1000 judges the image encoded data storage state of the reception buffer using the image encoded data storage amount and a pre-stored threshold amount (hereinafter, "reception buffer storage amount judging step") (Step S102). The detail of the reception buffer storage amount judgment processing is described in FIG. 11. Next, receiving a decoding timing signal inputted from outside, the image decoding device 1000 determines which part of the image encoded data stored in the reception buffer is decoding target encoded data to be decoded, based on an image encoded data storage state and importance levels of respective video packets composing image encoded data stored in a reception buffer (hereinafter, "decoding video packet control step") (step S103). After the determination of the decoding target encoded data, the image decoding device 1000 performs decoding processing on the decoding target encoded data, and outputs a decoded image (hereinafter, "decoding step") (step S104). The detail of decoding target encoded data determination processing and the decoding processing is described in FIG. 12.

Reception Buffer Storage Amount Judgment Processing

Figure 11:
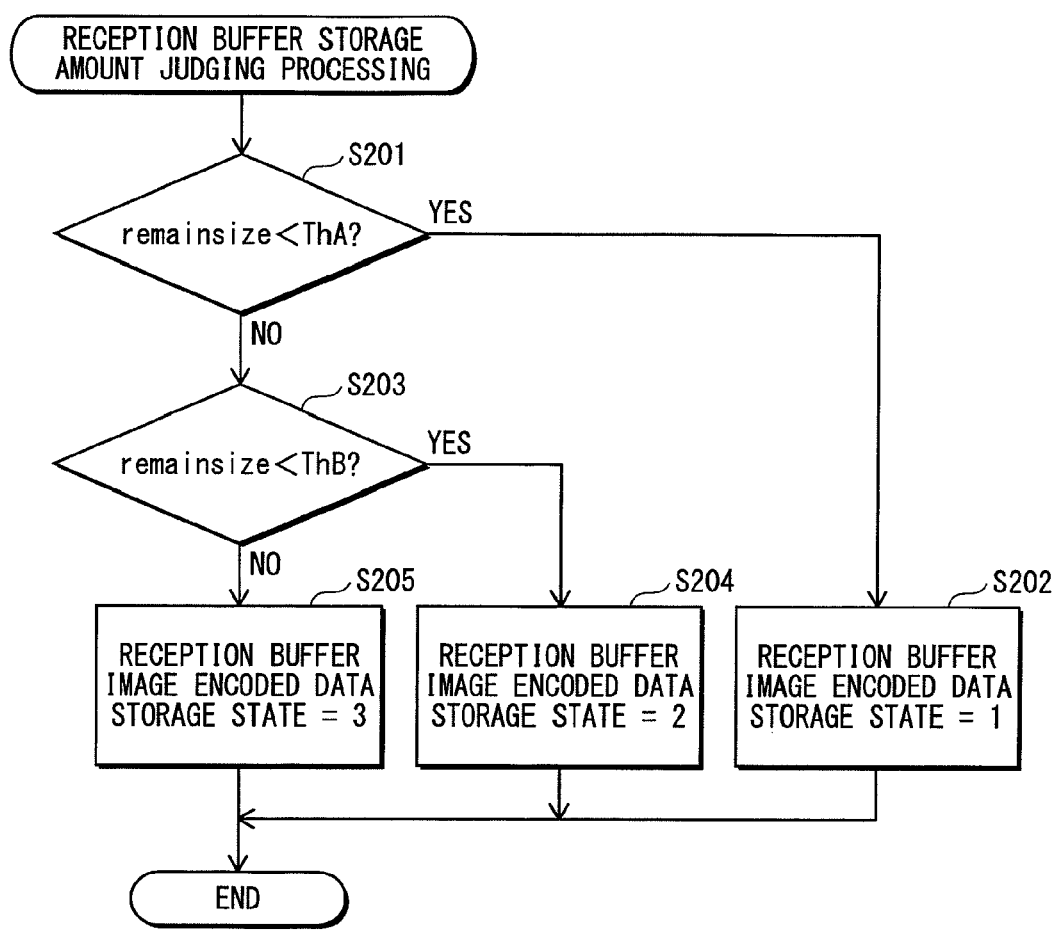
FIG. 11 is a flowchart showing a reception buffer storage amount judging processing.

FIG. 11 shows a flowchart showing reception buffer storage amount judging processing in the judgment core unit 203.

As shown in FIG. 11, the judgment core unit 203 compares the remainsize 201 with the threshold amount ThA (Step S201). When a result of the comparison shows that the threshold amount ThA is larger than the remainsize 201 (Step S201: Yes), the judgment core unit 203 sets 1 as reception buffer image encoded data storage state (Step S202).

When the result of the comparison shows that the remainsize 201 is equal to or larger than the threshold amount ThA (Step S201: No), the judgment core unit 203 compares the remainsize 201 with the threshold amount ThB. When the threshold amount ThB is larger than the remainsize 201 as a result of the comparison (Step S203: Yes), the judgment core unit 203 sets 2 as the reception buffer image encoded data storage state (Step S204).

When the result of the comparison shows that the remainsize 201 is equal to or larger than the threshold ThB (Step S203: No), the judgment core unit 203 sets 3 as reception buffer image encoded data storage state.

As mentioned above, since the remainsize 201 is 0x0400, the ThA is 0x0100, and the ThB is 0x0600, the judgment core unit 203 sets 2 as a reception buffer image encoded data storage state.

Decoding Target Encoded Data Determination Processing and Decoding Processing

Figure 12:
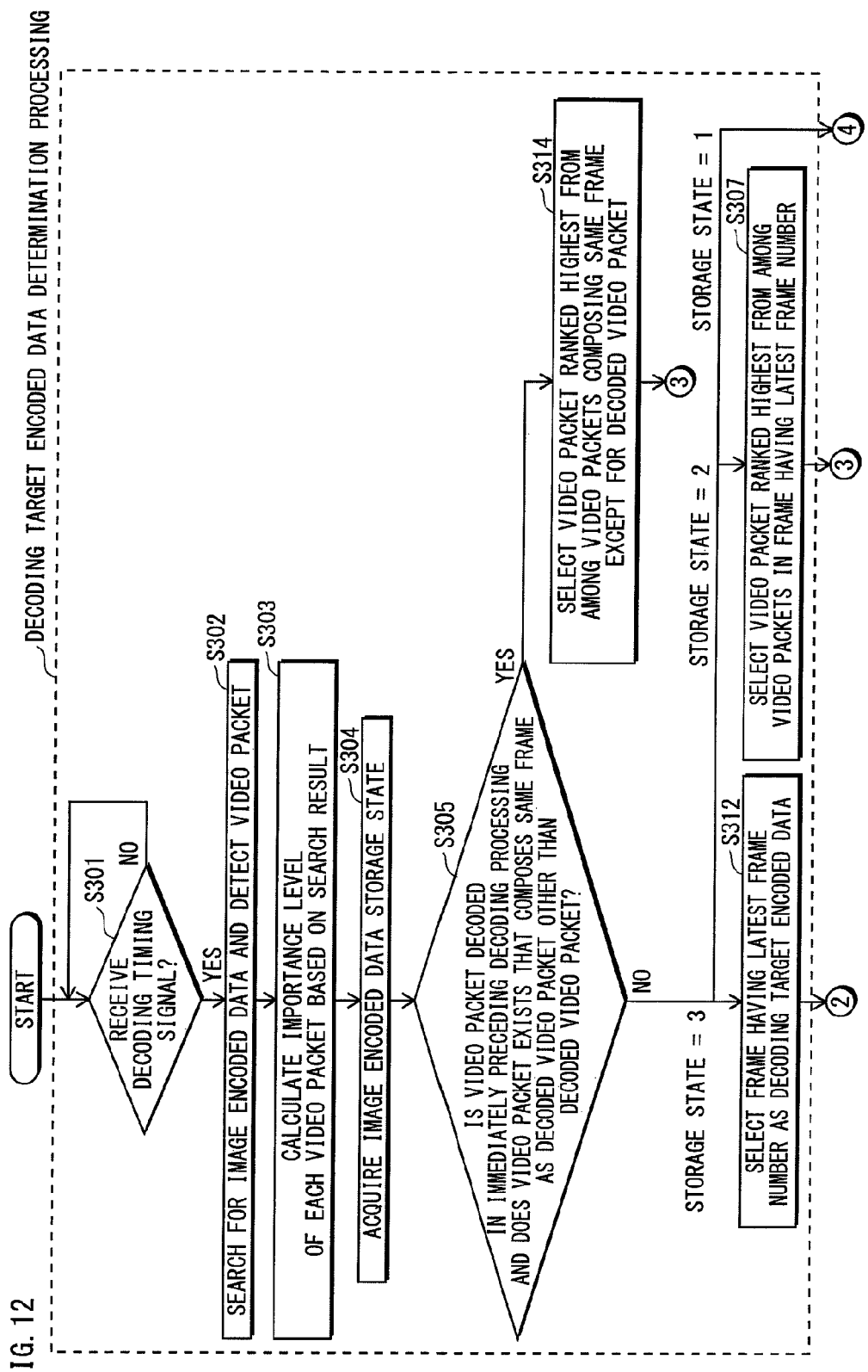
FIG. 12 is a flowchart showing decoding target encoded data determination processing and decoding processing.
Figure 13:
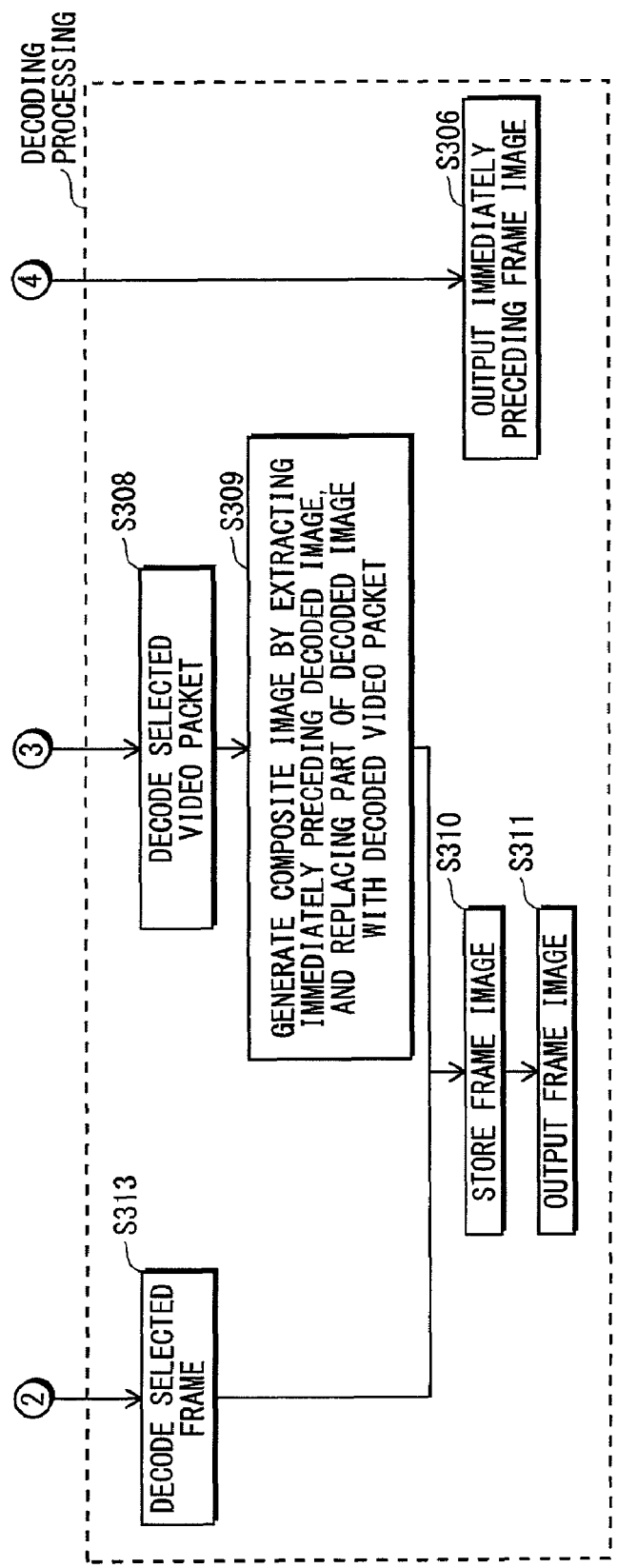
FIG. 13 is a flowchart showing decoding target encoded data determination processing and decoding processing.
Figure 14:
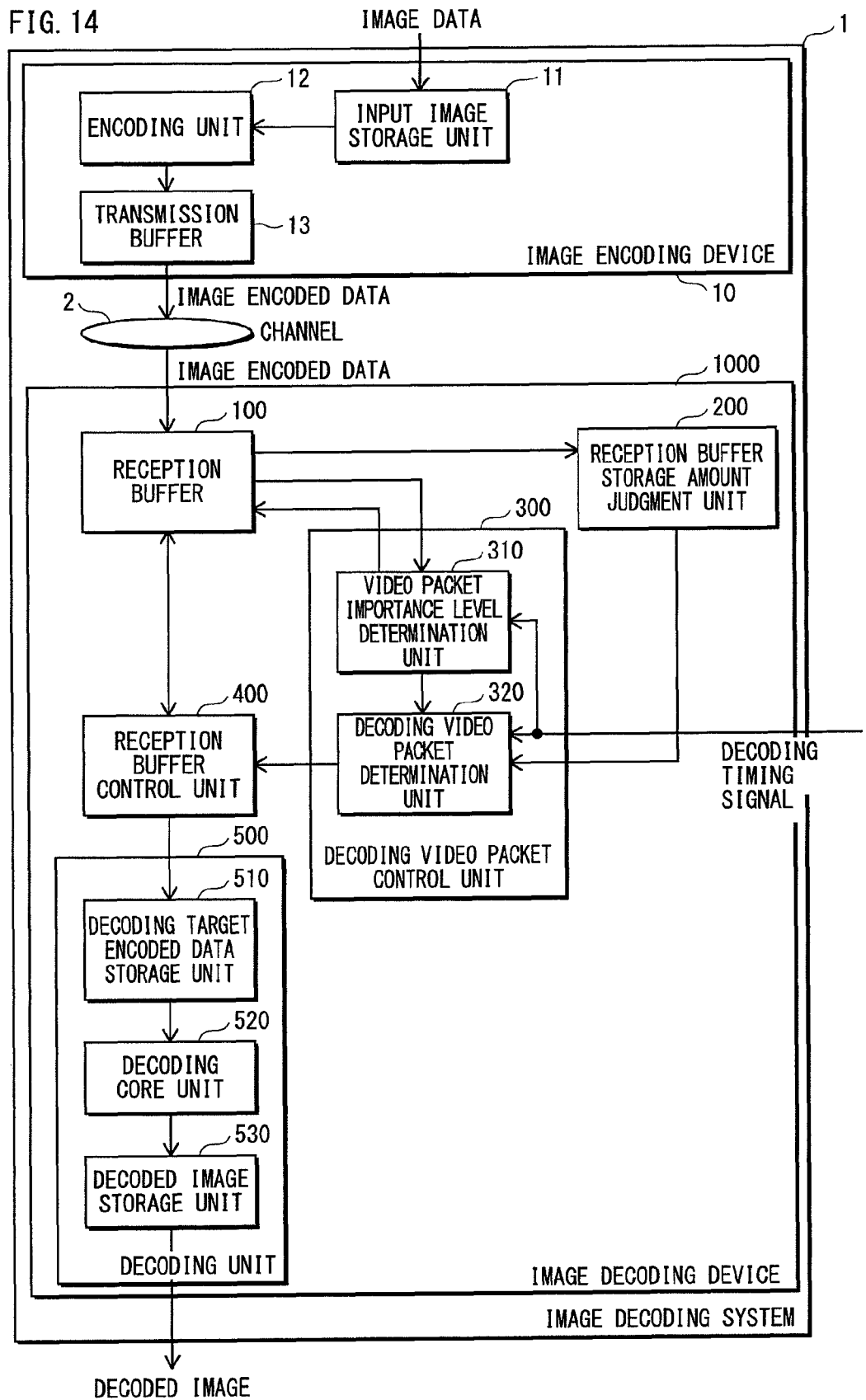
FIG. 14 is a block diagram of an image decoding system in the second embodiment of the present invention.

Each of FIG. 12 and FIG. 13 shows a flowchart regarding decoding target encoded data selection processing and decoding processing.

Receiving a decoding timing signal (Step S301: Yes), the video packet detection unit 311 searches for image encoded data stored in the reception buffer 100, and detects video packets composing the image encoded data (Step S302). Once the video packets are detected by the video packet detection unit 311, the video packet importance level calculation unit 313 calculates an importance level for each of the video packets based on the search result, and ranks respective video packets according to the importance levels (Step S303).

After acquiring the image encoded data storage state (Step S304), the decoding video packet determination unit 320 judges whether or not another video packet exists that composes the same frame as a frame of a video packet that has been decoded in an immediately preceding decoding processing based on the search result (Step S305). When the judgment result is negative (Step S305: No), the video packet determination unit 320 performs control according to the image encoded data storage state which has been acquired in the step S304.

When the acquired storage state is 1, the decoding unit 500 outputs an immediately preceding frame image stored in the decoded image storage unit 530 (Step S306).

When the acquired storage state is 2, the decoding video packet determination unit 320 selects a video packet to be a decoding target encoded data based on the search result and the importance levels of the respective video packets. More specifically, the decoding video packet determination unit 320 selects a video packet ranked highest from among video packets in a frame having the latest number in the search result (Step S307). When the selected video packet is inputted by the reception buffer control unit 400, the decoding unit 500 decodes the video packet (Step S308). Furthermore, the decoding unit 500 generates a frame image by replacing an area which has not been generated in the decoding processing with a past decoded image. More specifically, the decoding unit 500 extracts an immediately preceding decoded image, and generates a composite image by replacing part of the immediately preceding decoded image with a video packet which has been decoded in the step S308 (Step S309). After generating the composite image, the decoding core unit 520 stores the frame image in the decoded image storage unit 530 (Step S310). Then the decoding unit 500 outputs the frame image (Step S311).

When the acquired storage state is 3, the decoding video packet determination unit 320 selects a frame to be decoding target encoded data based on the search result. More specifically, the decoding video packet determination unit 320 selects a frame having the latest frame number in the search result as decoding target encoded data (Step S312). When the selected frame is inputted by the reception buffer control unit 400, the decoding unit 500 decodes the frame (Step S313). After the decoding core unit 520 stores the frame image in the decoded image storage unit 530 (Step S310), the decoding unit 500 outputs the frame image (Step S311).

When the judgment result in Step S305 is affirmative (Step S305: Yes), the decoding video packet determination unit 320 selects a video packet ranked highest from among video packets composing the frame except for a video packet which has been decoded (Step S314). The selected video packet is decoded in the Step S308. In such way, it is possible to update part of the image considered to be important to a user first by decoding video packets in order from the highest-ranked video packet, and generating frame images such that a ratio of replaced part of image data gradually increases with each replacement.

Also, when the storage state is 3, image data is replaced in units of frames. Therefore, it is possible to realize smooth changes in display content, and to provide images which are easy for the user to view.

According to the present embodiment as described in the above, it is possible to prevent the update of the display image from stopping for a certain period of time or to shorten a period in which the update of the display image is stopped by updating images in the units of video packets at a plurality of intervals of decoding processing (or displaying processing performed on a decoded image) even under the condition in which the reception buffer underflow occurs. Therefore, it is possible to keep the user from being concerned about device failure, disconnection of communication and the like. Furthermore, it is possible to make time for the reception buffer to receive the image encoded data, and to reduce the possibility in which a reception buffer underflow occurs by updating an image in the units of video packets.

Second Embodiment

The present embodiment relates to an image decoding system composed of the image decoding device of the first embodiment and the image encoding device.

As shown in FIG. 10, the image decoding system 1 is composed of the image decoding device 1000 of the first embodiment, an image encoding device 10 including an input image storage unit 11, an encoding unit 12 and a transmission buffer 13, and a channel 2.

In the image encoding device 10, image data inputted from outside is stored in the input image storage unit 11.

The encoding unit 12 (i) reads image data stored in the input image storage unit 11, (ii) performs encoding processing and (iii) outputs image encoded data which is the encoding result to the transmission buffer 13. Here, the image encoded data outputted by the encoding unit 12 is encoded in the image fragments, and is composed of the plurality of image blocks. Each of the image blocks is composed of at least one of the image fragments.

In the present embodiment, the image encoded data is encoded data which has been encoded according to the MPEG-4 (ISO/IEC14496-2) method, and may be structured such that the image fragments are macroblocks, and the image blocks are video packets. Also, the structural example of the present embodiment may be what is described in the first embodiment using FIG. 3. As with the first embodiment, a description is given with image encoded data being encoded according to the MPEG-4 method. However, the encoded data is not limited to this, and may be any data which has been encoded using image compression technology.

Image encoded data stored in the transmission buffer 13 is transmitted to the image decoding device 1000 via the channel 2 at a predetermined rate.

Although the image decoding device 1000 performs decoding processing on the image encoded data inputted via the channel 2, such decoding processing in the present embodiment is the same as the decoding processing described in the first embodiment. Therefore, a description of such decoding processing is omitted.

According to the present embodiment shown in the above, it is possible to prevent the update of the display image from stopping for a certain period of time or to shorten a period in which the update of the display image is stopped by updating images in the units of video packets at a plurality of intervals of decoding processing (or displaying processing performed on a decoded image) even under the condition in which the reception buffer underflow occurs. Therefore, it is possible to keep the user from being concerned about device failure, disconnection of communication and the like.

Third Embodiment

The present embodiment is an embodiment when an image decoding device in the first embodiment is realized by software.

Figure 15:
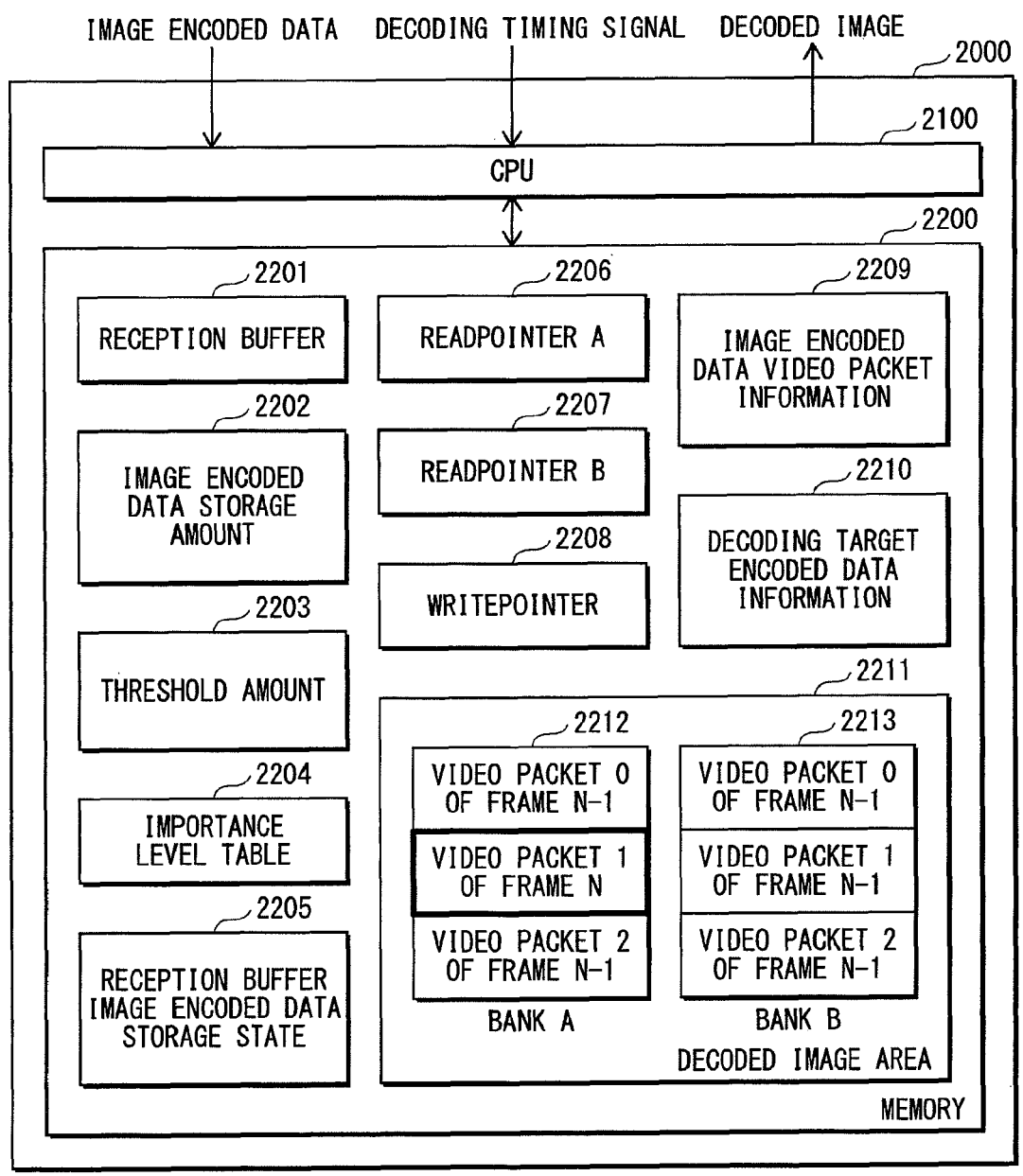
FIG. 15 is a block diagram of a processing device in a third embodiment of the present invention.

FIG. 15 a block diagram showing a processing device that embodies the image decoding method including steps shown by the flowchart of FIG. 10 in the first embodiment.

As shown in FIG. 15, a processing device 2000 (i) includes a CPU 2100 and a memory 2200, (ii) executes processing in each step (101 to 104) of the image decoding method as a program that is operated on the CPU and (iii) arranges an area for storing each kind of data to be inputted, kept, referred to and outputted in each step (101 to 104) of the image decoding method (a reception buffer 2201, an image encoded data storage amount 2202, a threshold amount 2203, an importance level table 2204, a reception buffer image encoded data storage state 2205, a readpointer A 2206, a readpointer B 2207, a writepointer 2208, image encoded data video packet information 2209, decoding target encoded data information 2210 and a decoded image area 2211 (including a bank A 2212 and a bank B 2213)) in a memory 2200.

The following describes detail of each step (101 to 104) in the image encoded method.

Firstly, when image encoded data is inputted from outside in an image encoded data storing step, the image encoded data is stored in an address area indicated by the writepointer 2208 on the reception buffer 2201.

Here, an address value indicated by the writepointer 2208 has an initial value of 0x0000, and is incremented by one every time one byte of the image encoded data is stored in the reception buffer 2201. While the image encoded data is being stored in the reception buffer 2201 using the write pointer 2208, the image encoded data storage amount 2202 is incremented by one every time one byte of the image encoded data is stored. As with the storage state of the image encoded data in the memory 101 in FIG. 2 shown in the first embodiment, the address value indicated by the writepointer 2208 is 0x0500 with the image encoded data stored at addresses 0x0000 to 0x04FF in the reception buffer 2201.

Also, the image encoded data has the structure shown in FIG. 3 in the first embodiment (QCIF, composed of three video packets (the video packet 0 (MB0 to MB32), the video packet 1 (MB33 to MB56), and the video packet 2 (MB66 to MB98)).

One frame-worth of the image encoded data (frame N) is stored in the reception buffer 2201 so as to be composed of the video packet 0 (addresses 0x0100 to 0x01FF), the video packet 1 (addresses 0x0200 to 0x02FF) and the video packet 2 (addresses 0x0300 to 0x03FF).

Next, the following is performed in the reception buffer storage amount judging step. The CPU (i) reads the image encoded data storage amount 2202 which has been updated in the image encoded data storing step and the decoding step, and the threshold amount ThA and the threshold amount ThB stored in the threshold amount 2203, and (ii) judges the reception buffer image encoded data storage state 2205 based on the image encoded data storage amount 2202, the threshold amount ThA and the threshold amount ThB. As with the first embodiment, the threshold amount ThA is 0x0100, the threshold amount ThB is 0x0600, and a judgment flow of the reception buffer image encoded data storage state is the same as the judgment flow of the reception buffer image encoded data storage state in the first embodiment. Therefore, the CPU sets 2 as reception buffer image encoded data storage state 1127.

Next, the following processing is performed in a decoding video packet control step when a decoding timing signal indicating intervals of decoding processing rates (or rates of display processing performed on decoded image) from outside.

Firstly, the image encoded data stored in an address shown by the readpointer A 2206 is read from the reception buffer 2201. Here, the address value indicated by the readpointer A 2206 has an initial value of 0x0000. The readpointer A 2206 is incremented by one every time one byte of the image encoded data read while the image encoded data is read from the reception buffer 2201. Reading of the image encoded data from the reception buffer 2201 is performed until the address value shown by the readpointer A 2206 is the same as an address value shown by the writepointer 2208. Here, the readpointer A 2206 indicates 0x0100, and the writepointer 2208 indicates 0x0500. The image encoded data which to be read is data stored at addresses 0x0100 to 0x04FF.

Next, the CPU searches for the read image encoded data, and detects video packets composing the image encoded data. A method of detecting the frame of the image encoded data stored in the reception buffer 2201 and the video packets composing the frame of the image encoded data is the same as the detecting method shown in the first embodiment. Also, the image encoded data video packet information 2209 which is the search result is the same as the search result shown in FIG. 6.

Also, the importance level table 2204 is the same as the importance level table shown in FIG. 7 in the first embodiment.

Next, an importance level of each video packet (rank 1 to rank 3) is determined based on the image encoded data video packet information 2209 and the importance table 2204. A method for determining an importance level for each video packet is the same as the importance level determination method described in the first embodiment. Also, a rank (1) is assigned to the video packet 1 of the frame N, a rank (2) is assigned to the video packet 0 of the frame N, and a rank (3) is assigned to the video packet 2.

The decoding target encoded data information 2210 is selected based on the importance level (rank 1 to rank 3) of each video packet and the reception buffer image encoded data storage state 2205. That is, the CPU judges which video packet is stored from the reception buffer image encoded data storage state 2205. Also, a highest-ranked video packet (video packet 1 of the frame N) of stored video packets is selected as the decoding target encoded data information 2210.

The decoding target encoded data information 2210 indicates the start address (0x0200) and the size (0x0100) of the video packet 1 of the frame N in the reception buffer 2201. If a video packet exists that has been the decoding target encoded data when decoding target encoded data is selected based on the rank (from 1 to 3) of each video packet and the reception buffer image encoded data storage state 2205, such video packet is no longer an judging target, and a rank of each video packet positioned lower than such video packet is raised by one rank.

Next, in the decoding step 1104, when a decoding timing signal indicating intervals of decoding processing (or display processing of a decoded image) rates is inputted from outside, the following processing is performed.

The image encoded data is read from the reception buffer 2201 using the readpointer B 2207 based on the decoding target encoded data information 2210 (the start address (0x0200) and the size (0x0100) in the reception buffer 2201 of the video packet 1 of the frame N) selected in the decoding video packet control step 1103, and decoding processing is performed. An address value indicated by the readpointer B 2207 is set to 0x0200 at the start of reading the image encoded data. Also, while the image encoded data is being read from the reception buffer 2201, the address value indicated by the readpointer B 2207 is incremented by one every time one byte of the image encoded data is read. Also, the image encoded data storage amount 2202 is decremented by one every time one byte of the image encoded data is read from the reception buffer 2201.

Note that reading of the image encoded data from the reception buffer 2201 is repeated until the size of the image encoded data becomes the size (0x0100) indicated by the decoding target encoded data information 2210.

A composite image (partially updated decoded image) is generated by replacing an area which has not been generated in the decoding processing with an immediately preceding decoded image. Specifically, this is as described in the first embodiment.

The generated decoded image (only the video packet 1 of the frame N is updated) is outputted as a decoded image after being stored in the decoded image area 2211. Also, the decoded image area 2211 has two areas: a bank A 2212 and a bank B 2213 for storing decoded images. The CPU stores the decoded images alternately in the bank A 2212 and the bank B 2213 (e.g. outputting a first one of the decoded images to the bank A 2212, a second one of the decoded images to the bank B 2213, a third one of the decoded images to the bank A 2212 and so on). Immediately preceding decoded images (video packets 0, 1, 2 of the frame N−1) are stored in the bank B 2213, and the decoded image outputted in the present decoding processing is outputted to the bank A 2212.

According to the above structure, even if the decoding target encoded data to be inputted is only the video packet 1 of the frame N (MB33 to MB65, heavy-boxed part), it is possible to easily obtain a decoded image by replacing other areas (MB0 to MB32 and MB66 to MB98) with immediately preceding decoded images (video packets 0 and 2 of the frame N−1) stored in the bank B 2213, respectively.

Next, as with the first embodiment, it is possible to obtain the same result as the result shown in FIG. 9 by repeating the same processing with timing that the image encoded data and the decoding timing signal are inputted from outside. That is, it is possible to generate a composite image such that the occupancy ratio of the decoding target encoded data gradually increases.

According to the present embodiment as shown in the above, even under a condition in which the reception buffer underflow occurs, it is possible to prevent update of the image display from stopping for a certain period of time or shorten a time period in which the update stops by updating images in units of video packets at a plurality of intervals of decoding processing (or display processing of the decoded image). Therefore, it is possible to keep the user from being concerned about device failure, disconnection of communication and the like.

Modification 1

Although the table in which highest importance levels are given to positions that are closest to the center of the image is used as an importance level table in the above embodiments, a table which is set using other elements (e.g. an amount of codes, image motion, kinds of macroblocks, a quantized parameter, data reception order or the like) may be used. Furthermore, it is possible to obtain the same result by adopting a structure in which a table is dynamically changed or the like.

A description is given, as an example, of the case of using a table in which the highest importance levels are given to positions having largest image motion (motion vector obtained in decoding processing).

In this case, when searching for the image encoded data inputted as data for controlling and detecting video packets composing the image encoded data, the video packet detection unit 311 detects and stores motion vectors (horizontal direction and vertical direction) of macroblocks included in each video packet in addition to a video packet start address, a start macroblock number, an end macroblock number and a video packet data size that relate to each video packet shown in FIG. 6.

In this case, when the detected macroblock is a type that does not have a motion vector, a motion vector (horizontal direction and vertical direction) regarding such macroblock is considered to be (0 and 0).

FIG. 16A shows a search result in the video detection unit 311, and FIG. 16B shows an importance level table stored in the importance level table storage unit 312a.

As shown in FIG. 16A, it is possible to obtain, for each video packet, information pieces on a start macroblock number, an end macroblock (MB) number, a start address, a size and a motion vector (horizontal direction and vertical direction) of a macroblock included in each video packet.

Also, as shown in FIG. 16B, in the importance level table 3101, importance levels (highest: 5 to lowest: 0) are allocated according to sizes of motion vectors, and the larger an absolute value of a motion vector is, the higher the importance level is.

The video packet importance level calculation unit 313 calculates an importance level for each video packet based on a search result 1300 of each video packet in the video packet detection unit 311 and an importance level table 1301 stored in the importance level table storage unit 312a.

Specifically, an importance level is calculated as follows. Firstly, a video packet 0 of a frame N has a start macroblock (MB) number of 0, and an end macroblock (MB) number of 32. Also, motion vectors (horizontal direction and vertical direction) of macroblocks 0 to 32 included in the video packet 0 of the frame N are (0 and j) and (1 and −5) for macroblocks 0 to 21 and macroblocks 22 to 32, respectively. Therefore, a total sum of importance levels of motion vectors (both of horizontal direction and vertical direction) based on the importance level table 1301 is 0×22+0×22+1×11+2×11=33. Therefore, an importance level of the video packet 0 of the frame N is 33.

Also, a video packet 1 of a frame N has a start macroblock (MB) number of 33, and an end macroblock (MB) number of 65. Also, motion vectors (horizontal direction and vertical direction) of macroblocks 33 to 65 included in the video packet 1 of the frame N are (−1 and 2) and (0 and 0) for macroblocks 33 to 54 and macroblocks 55 to 65, respectively. Therefore, a total sum of importance levels of motion vectors (both of horizontal direction and vertical direction) based on the importance level table 1301 is 1×22+1×22+0×11+0×11=44. Therefore, an importance level of the video packet 1 of the frame N is 44.

Also, a video packet 2 of a frame N has a start macroblock (MB) number of 66, and an end macroblock (MB) number of 98. Also, motion vectors (horizontal direction and vertical direction) of macroblocks 66 to 98 included in the video packet 2 of the frame N are (16 and −20) and (0 and 0) for macroblocks 66 to 76 and macroblocks 77 to 98, respectively. Therefore, a total sum of importance levels of motion vectors (both of horizontal direction and vertical direction) based on the importance level table 1301 is 4×11+5×11+0×22+0×22=99. Therefore, an importance level of the video packet 2 of the frame N is 99.

It can be seen from the above that the video packet 2 of the frame N has the highest importance level (99), the video packet of 1 of the frame N has the second highest importance level (44) and the video packet 0 of the frame N has the lowest importance level (33). The respective video packets of the frame N are ranked according to the importance levels. Since the video packet 2 of the frame N has the highest importance level, a rank (1) is assigned to the video packet 2. Next, a rank (2) is assigned to the video packet 1 of the frame N, and a rank (3) is assigned to the video packet 0 of the frame N.

The video packet importance level calculation unit 313 notifies the decoding video packet determination unit 320 of the above determined rank (from 1 to 3) of each video packet. Since subsequent processing is the same as the processing in the above embodiments, a description thereof is omitted.

Modification 2

In the above modification 1, the importance levels are calculated by using an importance level table which is based on motion vectors. However, it is not possible to obtain motion vector when a picture type of a frame is an I picture. Therefore, when the picture type of the frame is the I picture, importance levels cannot be calculated using the importance level table which is based on motion vectors. Therefore, it is necessary, for example, to update the frame according to other standards such as updating the frame starting from an upper part of the frame in order.

It is possible to switch between two importance level tables in the present modification, which makes it possible to calculate importance levels based on the importance level tables, and update part of the frame considered to be important for the user first even when the picture type of the frame is the I picture. Of the two importance level tables, one is a table in which the highest importance levels are given to the positions having largest image motion (motion vector obtained in decoding processing) as shown in FIG. 16B in the above, and the other is a table in which the larger an average amount of codes per macroblock included in each video packet is, the higher the importance level is.

In this case, when searching for a frame of image encoded data inputted as data for controlling, and detecting video packets composing the frame of the image encoded data, the video packet detection unit 311 detects and stores a picture type (I picture (inter-screen encoded picture)/other pictures (intra-screen encoded picture)) of such frame in addition to a video packet start address, a start macroblock number and an end macroblock number, a video packet data size, motion vectors (horizontal direction and vertical direction) of macroblocks included in each video packet that relate to each video packet shown in the above.

FIG. 17A shows a search result in the video packet detection unit 311, and FIG. 17B shows an importance table regarding an average amount of codes stored in the importance level table storage unit 312b.

As shown in FIG. 17A, it is possible to obtain, for each video packet, information pieces on a start and an end macroblock (MB) number, a start address, a size, motion vectors (horizontal direction and vertical direction) of macroblocks included in each video packet, and a picture type of the frame.

Also, as shown in FIG. 17B, importance levels (highest: 5 to lowest: 0) are allocated according to an average amount of codes per macroblock in an importance level table 1401, and the larger the average amount of codes is, the higher the importance level is.

The video packet importance level calculation unit 313 calculates an importance level for each video packet based on a search result 1400 showing search results for respective video packets in the video packet detection unit 311, the importance level tables 1301 and 1401 stored in the importance level table storage units 312a and 312b.

Firstly, the video packet importance level calculation unit 313 judges, from the search result 1400, whether a current frame is an I picture or a picture other than the I picture.

When the current frame is a picture other than the I picture, the same processing as the processing shown in the above modification 1 is performed.

On the other hand, when the current frame is the I picture according to the search result 1400, an importance level for each of the video packets is determined by the following procedures using the importance level table 1401.

Specifically, an importance level is calculated as follows. Firstly, a video packet 0 of a frame N has a start macroblock (MB) number of 0, and an end macroblock (MB) number of 32. Also, the number of macroblocks included in the video packet 0 of the frame N is 33, and a size of the video packet 0 of the frame N is 0x0100. Therefore, an average code amount per macroblock is 0x0100/33=7.76. Accordingly, an importance level of the video packet 0 of the frame N is 1.

Also, a video packet 1 of a frame N has a start macroblock (MB) number of 33, and an end macroblock (MB) number of 65. Also, the number of macroblocks included in the video packet 1 of the frame N is 33, and a size of the video packet 1 of the frame N is 0x0100. Therefore, an average code amount per macroblock is 0x0100/33=7.76. Accordingly, an importance level of the video packet 2 of the frame N is 1.

Also, a video packet 2 of a frame N has a start macroblock (MB) number of 66, and an end macroblock (MB) number of 98. Also, the number of macroblocks included in the video packet 2 of the frame N is 33, and a size of the video packet 2 of the frame N is 0x0100. Therefore, an average code amount per macroblock is 0x0100/33=7.76. Accordingly, an importance level of the video packet 2 of the frame N is 1.

It can be seen from above that the video packet 0 of frame N, the video packet 1 of the frame N and the video packet 2 of the frame N have the same importance level which is (1). The respective video packets of the frame N are ranked according to their importance levels. However, since the respective three video packets 0, 1 and 2 of the frame N have the same importance level value, a video packet having the lowest start macroblock (MB) number is ranked highest. Therefore, a rank 1, a rank 2 and a rank 3 are assigned to the video packet 0 of the frame N, the video packet 1 of the frame N and the video packet 2 of the frame N, respectively. The video packet importance level calculation unit 313 notifies the decoding video packet determination unit 320 of the above determined rank (from 1 to 3) of each of the video packets.

Since subsequent processing is the same as the processing in the above embodiments, the description thereof is omitted.

In such way, even if a current frame is an I picture, it is possible to calculate importance levels based on the importance level table 1401. Therefore, it is possible to enhance accuracy when the importance levels are calculated.

Modification 3

In the above embodiment, although two threshold amounts are provided in the threshold amount storage unit 202, it is possible to provide three or more threshold amounts. For example, three threshold amounts may be provided such that a threshold amount Tha is 0x0100, a threshold amount Thb is 0x0200 and a threshold amount Thc is 0x0300. If a storage amount of the encoded data is less than the threshold amount Tha, an encoded data storage state is set to 1. If the storage amount of the encoded data is equal to or more than the threshold amount Tha, and less than the threshold amount Thb, the encoded data storage state is set to 2. If the storage amount of the encoded data is equal to or more than the threshold Thb and less than the threshold amount Thc, the encoded data storage state is set to 3. If the storage amount of the encoded data is equal to or more than the threshold amount Thc, the encoded data storage state is set to 4. At this time, when the encoded data storage state is 1, an image update is not performed on a decoding target encoded data. Also, when the encoded data storage state is 2, every video packet can be decoding target encoded data. When the encoded data storage state is 3, every second video packet can be decoding target encoded data. When the encoded data storage state is 4, every frame can be decoding target encoded data. In such way, it is possible to update an image according to the encoded data storage state.

Supplementary Remarks

Note that although the present invention is described based on the above embodiments, it is needless to say that the present invention is not limited to the above embodiments. The present invention includes the following cases.

(1) The present invention may be a method including the steps shown in the above-described flowcharts, a program including program codes that have a computer execute the steps shown in the above flowchart or a digital signal composed of the computer programs.

Also, the present invention may be a computer-readable recording medium such as a flexible disk, a hard disk, a CD-ROM, an MO, a DVD, a DVD ROM, a BD (Blu-ray Disc) or a semiconductor memory, that stores the computer program or the digital signal. Furthermore, the present invention may be the computer program or the digital signal recorded on any of the aforementioned recording media.

Furthermore, the present invention may be the computer program or the digital signal transmitted on an electronic communication network, a wireless or wired communication network, a network of which the Internet is representative, or a data broadcast.

Furthermore, present invention may be a computer system that includes a microprocessor and a memory. In this variation, the memory may store the computer program, and the microprocessor may perform operations in accordance with the computer program.

Furthermore, by transferring the program or the digital signal to the recording medium, or by transferring the program or the digital signal via a network or the like, the program or the digital signal may be executed by another independent computer system.

(2) The present invention may be implemented as an LSI that controls the image decoding device. Such LSI can be realized by accumulating each function block shown in FIG. 1. These function blocks may be realized separately as individual LSI or part or all may be included on an LSI.

Also, a technique of making integrated circuits is not limited to the technique of the LSI. Therefore, the integrated circuit may be realized by a dedicated circuit or a multipurpose processor. The FPGA (field programmable gate array) capable of being programmed after the production of the LSI or a reconfigurable processor capable of restructuring the connection and setting of circuit cells inside the LSI may be used. Furthermore, if technology of creating the integrated circuit that replaces the LSI appears due to the advance of semiconductor technology or other deriving technology, naturally, function blocks may be accumulated using the technology. An application of biotechnology and the like are possible.

(3) In the above embodiments, the image update is performed in units of frames when the image encoded data as large as two or more frames is received. However, the image update may be performed in units of frames when the image encoded data as large as one or more frames is received, and the image update may be performed in units of video packets when image encoded data smaller than one frame is received (at the time when the reception buffer underflow occurs). As shown in the above embodiments, even when the one or more frames worth of the image encoded data is received (i.e. the reception buffer underflow is not caused), it is possible to shorten a time period in which the update of image display stops, compared to a case of performing the update of an image in units of video packets after the reception buffer underflow occurs, by performing the image update in units of video packets when the reception buffer underflow is highly likely to be caused.

Whether or not the reception buffer underflow is highly likely to occur may be judged by an amount of image encoded data in the reception buffer as shown in the above embodiments, or may be judged based on changes in an amount of image encoded data with time. In the case where whether the reception buffer underflow is highly likely to occur is judged according to the amount of image encoded data, it is possible to judge that the reception buffer underflow is highly likely to occur when only a few frames worth of image encoded data is stored in the reception buffer, for example.

In the case where whether the reception buffer underflow is highly likely to occur is judged according to changes in an amount of image encoded data with time, it is possible to judge that the reception buffer underflow is highly likely to occur when an amount of image encoded data transmitted to the reception buffer from outside is smaller than an amount of image encoded data read from the reception buffer when decoded, for example.

Also, the image update may be performed on the video packets which have been received (e.g. two video packets, 0 and 1 when the video packet 0 and the video packet 1 have been received). This makes it possible to update the image in a unit close to a unit of one whole image, and to provide an image decoding device that does not make the user worry.

Furthermore, the image update may be performed in units of data size divided by a threshold amount. In this case, the user freely determines a threshold amount, which updates an image in units desired by the user.

(4) The above embodiments have the structure in which the image fragments are macroblocks, and the image blocks are video packets. However, the same result can be obtained with a structure in which the image fragments are blocks, and the image blocks are macroblocks. When the image blocks are macroblocks, it is possible to judge whether or not the reception buffer underflow is highly likely to occur when a lower amount of image encoded data is stored in the reception buffer compared to the case where the image blocks are video packets.

(5) In the above embodiments, the decoding processing is performed in units of video packets with timing that the decoding timing signal is inputted from outside. However, the same result can be obtained with a structure in which (i) the decoding processing is executed in units of images (frames), (ii) a decoding image to be updated in units of video packets is generated and outputted to outside.

(6) In the above embodiments, decoding is structured to be performed in units of video packets until all of the video packets in the frame are decoded every time the judgment is affirmative in the Step S305 shown in FIG. 12. However, even when the judgment is affirmative in the Step S305, the remaining the video packets composing the frame may be decoded altogether when the image encoded data storage state acquired in the Step S304 is 3.

(7) In the above embodiment, since a description is given, taking the MPEG-4 as an example, a term "video packet" is used. However, The term "video packet" has the same meaning as a term "slice" used in other encoding technology.

(8) The frame memory, the judgment unit, the composite image generation unit and the output unit that are described in "means to solve the problems" in the above correspond to the bank A or the bank B, the reception buffer storage judgment unit, the decoding core unit and the decoded image storage unit, respectively.

(9) It is also possible to provide a combination of any of the embodiments and modifications described in the above.

INDUSTRIAL APPLICABILITY

The present invention can be used for a terminal and the like that transmit and receive image decoded data at real time via channels such as the Internet, and is useful under a condition in which a reception buffer underflow possibly occurs.

The invention claimed is:

1. An image decoding device that, while taking pieces of image encoded data sequentially received from outside into a reception buffer, sequentially (i) reads the pieces of image encoded data from the reception buffer, (ii) decodes the read pieces of image encoded data into frames of image data and (iii) outputs the frames of image data, the image decoding device comprising:
a frame memory operable to temporarily hold a frame of the image data;
a judgment unit operable to make a judgment of whether or not underflow of the reception buffer is being caused, or whether or not the underflow is highly likely to be caused, based on a current value of or a temporal change in an image encoded amount stored in the reception buffer at the time of the judgment;
a composite image generation unit operable, when a result of the judgment is affirmative, to generate a frame of composite image data by (i) extracting a frame of the image data stored in the frame memory, (ii) decoding a part of the image encoded data stored in the reception buffer, and (iii) replacing a part of the extracted frame of the image data with the decoded part of the image encoded data; and
an output unit operable to output the frame of the composite image data which has been generated,
wherein during a period when the judgment maintains an affirmative result, the composite image generation unit repeatedly generates frames of the composite image data such that an occupancy ratio of the replaced part to the frame of the image data increases each time a frame of the composite image data is newly generated, and
wherein the output unit outputs the frames of the composite image data which have been generated in order of generation so that the frame of the image data is changed to the next frame gradually during the period when the judgment maintains an affirmative result.

2. The image decoding device of claim 1,
wherein each of the pieces of image encoded data received from outside is composed of a plurality of image blocks,
wherein the image decoding device further comprises:
an importance level calculation unit operable to calculate an importance level for each of the image blocks, and
wherein the composite image generation unit replaces the part of the frame of the image data stored in the frame memory with one of the image blocks having the highest importance level of the calculated importance levels.

3. The image decoding device of claim 2,
wherein each of the image blocks is composed of at least one of image fragments,
wherein numeric values are pre-allocated to the image fragments in one to one correspondence, and
wherein the importance level for each of the image blocks is calculated based on the numeric values allocated to the image fragments composing the corresponding image blocks.

4. The image decoding unit of claim 3,
wherein the allocated numeric values are highest at positions closest to a center of a frame.

5. The image decoding device of claim 3,
wherein as image motions become larger, the allocated numeric values become higher.

6. The image decoding device of claim 3,
wherein the numeric values are allocated in a plurality of tables, and
wherein the importance level calculation unit dynamically switches between the plurality of tables based on information obtained from apiece of the image encoded data stored in the reception buffer, and calculates the importance levels.

7. The image decoding device of claim 6,
wherein the information obtained from the piece of the image encoded data is information showing a picture type.

8. The image decoding device of claim 1,
wherein the composite image generation unit generates, when a result of the judgment is negative, a new frame of the image data by (i) extracting a previous frame of the image data stored in the frame memory, (ii) decoding a frame of the image encoded data stored in the reception buffer, and (iii) replacing the extracted frame of the image data with the decoded frame of the image encoded data.

9. The image decoding device of claim 1, further comprising:
an auxiliary frame memory operable to temporarily hold a frame of the composite image data,
wherein the composite image generation unit stores frames of the composite image data which have been generated alternately into the frame memory and the auxiliary frame memory.

10. The image decoding device of claim 1,
wherein the composite image generation unit replaces, in units of slices, the frame of the image data stored in the frame memory with the next frame of the image data decoded from the image encoded data during the period when the judgment maintains an affirmative result.

11. The image decoding device of claim 10,
wherein a data size of the part of the image encoded data to be decoded at a time of the replacement varies according to the image encoded data amount stored in the reception buffer.

12. The image decoding device of claim 1,
wherein the frame of the image data stored in the frame memory has been decoded immediately before the composite image generation unit decodes the part of the image encoded data stored in the reception buffer.

13. An image decoding system comprising:
an image encoding device configured to transmit, to an image decoding device, pieces of image encoded data which are obtained by encoding pieces of image data; and
the image decoding device that, while taking the pieces of image encoded data transmitted from the image encoding device into a reception buffer, sequentially (i) reads the pieces of image encoded data from the reception buffer, (ii) decodes the read pieces of the image encoded data into frames of image data, and (iii) outputs the frames of image data,
the image decoding device comprising:
a frame memory operable to temporarily hold a frame of the image data;
a judgment unit operable to make a judgment of whether or not underflow of the reception buffer is being caused, or whether or not the underflow is highly likely to be caused, based on a current value of or a temporal change in an image encoded data amount stored in the reception buffer at the time of the judgment;
a composite image generation unit operable, when a result of the judgment is affirmative, to generate a frame of composite image data by (i) extracting a frame of the image data stored in the frame memory, (ii) decoding a part of the image encoded data stored in the reception buffer, and (iii) replacing a part of the extracted frame of the image data with the decoded part of the image encoded data; and
an output unit operable to output the frame of the composite image data
which has been generated,
wherein during a period when the judgment maintains an affirmative result, the composite image generation unit repeatedly generates frames of the composite image data such that an occupancy ratio of the replaced part to the frame of the image data increases each time a frame of the composite image data is newly generated, and wherein the output unit outputs the frames of the composite image data which have been generated in order of generation so that the frame of the image data is changed to the next frame gradually during the period when the judgment maintains an affirmative result.

14. A method for causing an image decoding device to while taking pieces of image encoded data sequentially received from outside into a reception buffer, sequentially (i) read the pieces of image encoded data from the reception buffer, (ii) decode the read pieces of image encoded data into frames of image data and (iii) output the frames of image data, the method comprising the steps of:
causing the image decoding device to judge whether or not underflow of the reception buffer is being caused, or whether or not the underflow is highly likely to be caused, based on a current value of or a temporal change in an image encoded data amount stored in the reception buffer at a time of the judgment;
causing the image decoding device to generate, when a result of the judgment is affirmative, a frame of composite image data by (i) extracting a frame of the image data stored in a frame memory, (ii) decoding a part of the image encoded data stored in the reception buffer, and (iii) replacing a part of the extracted frame of the image data with the decoded part of the image encoded data; and
causing the image decoding device to output the frame of the composite image data which has been generated,
wherein during a period when the judgment maintains an affirmative result, frames of the composite image data are repeatedly generated such that an occupancy ratio of the replaced part to the frame of the image data increases each time a frame of the composite image data is newly generated, and
wherein the frames of the composite image data which have been generated are outputted in order of generation so that the frame of the image data is changed to the next frame gradually during the period when the judgment maintains an affirmative result.

15. A system integrated circuit provided in an image decoding device that, while taking pieces of image encoded data sequentially received from outside into a reception buffer, sequentially (i) reads the pieces of image encoded data from the reception buffer, (ii) decodes the read pieces of image encoded data into frames of image data and (iii) outputs the frames of image data, the system integrated circuit comprising:
a frame memory operable to temporarily hold a frame of image data;
a judgment unit operable to make a judgment of whether or not underflow of the reception buffer is being caused, or whether or not the underflow is highly likely to be caused, based on a current value of or a temporal change in an image encoded data amount stored in the reception buffer at the time of the judgment;
a composite image generation unit operable, when a result of the judgment is affirmative, to generate a frame of composite image data by (i) extracting a frame of the image data stored in the frame memory, (ii) decoding a part of the image encoded data stored in the reception buffer, and (iii) replacing a part of the extracted frame of the image data with the decoded part of the image encoded data; and
an output unit operable to output the frame of the composite image data which has been generated,
wherein during a period when the judgment maintains an affirmative result, the composite image generation unit repeatedly generates frames of the composite image data such that an occupancy ratio of the replaced part to the frame of the image data increases each time a frame of the composite image data is newly generated, and
wherein the output unit outputs the frames of the composite image data which have been generated in order of generation so that the frame of the image data is changed to the next frame gradually during the period when the judgment maintains an affirmative result.

* * * * *